United States Patent [19]

Fuse

[11] Patent Number: 5,690,845
[45] Date of Patent: Nov. 25, 1997

[54] OPTICAL DEVICE FOR LASER MACHINING

[75] Inventor: Keiji Fuse, Osaka, Japan

[73] Assignee: Sumitomo Electric Industries, Ltd., Osaka, Japan

[21] Appl. No.: 539,161

[22] Filed: Oct. 4, 1995

[30] Foreign Application Priority Data

Oct. 7, 1994 [JP] Japan .................................. 6-243913

[51] Int. Cl.$^6$ .................................................. B23K 26/06
[52] U.S. Cl. ................................................. 219/121.74
[58] Field of Search ....................... 219/121.73, 121.74, 219/121.75; 359/855, 865

[56] References Cited

U.S. PATENT DOCUMENTS

| | | |
|---|---|---|
| 4,404,454 | 9/1983 | Taylor et al. |
| 4,469,931 | 9/1984 | Macken .............................. 219/121.72 |
| 5,055,653 | 10/1991 | Funami et al. ...................... 219/121.75 |
| 5,138,490 | 8/1992 | Hohberg et al. .................... 219/121.74 |
| 5,164,584 | 11/1992 | Wike, Jr. et al. |

FOREIGN PATENT DOCUMENTS

| | | | |
|---|---|---|---|
| 468328 | 1/1992 | European Pat. Off. ........... | 219/121.75 |
| 58-154484 | 9/1983 | Japan ................................ | 219/121.74 |
| 1-313196 | 12/1989 | Japan ................................ | 219/121.74 |
| 2-217187 | 8/1990 | Japan ................................ | 219/121.75 |
| 2-299791 | 12/1990 | Japan ................................ | 219/121.74 |

OTHER PUBLICATIONS

Patent Abstracts of Japan, Publication No. JP 1313196, Dec. 18, 1989.

Patent Abstracts of Japan, Publication No. JP 61088989, May 1986.

Patent Abstracts of Japan, Publication No. JP 1143785, Jun. 1989.

Patent Abstracts of Japan, Publication No. 07080672, Mar. 3, 1995.

Patent Abstracts of Japan, Publication No. 07060470, Mar. 7, 1995.

*Primary Examiner*—Geoffrey S. Evans
*Attorney, Agent, or Firm*—Wenderoth, Lind & Ponack

[57] ABSTRACT

A unit for splitting a laser beam into a plurality of beams is provided separately from a converging unit so that both units can be manufactured easily, replaced at low cost and are less likely to be polluted or damaged during laser machining. A laser beam produced by a laser oscillator and guided into a machining head through a transmitter is split into a plurality of beams by a plane reflecting mirror. The laser beams thus split are reflected by another reflecting mirror having a single paraboloidal surface so as to be converged on focal points. The first plane reflecting mirror comprises two semicircular mirrors which can be inclined independently of each other.

7 Claims, 25 Drawing Sheets

FIG. 14A
FIG. 14B
FIG. 14C
FIG. 14D
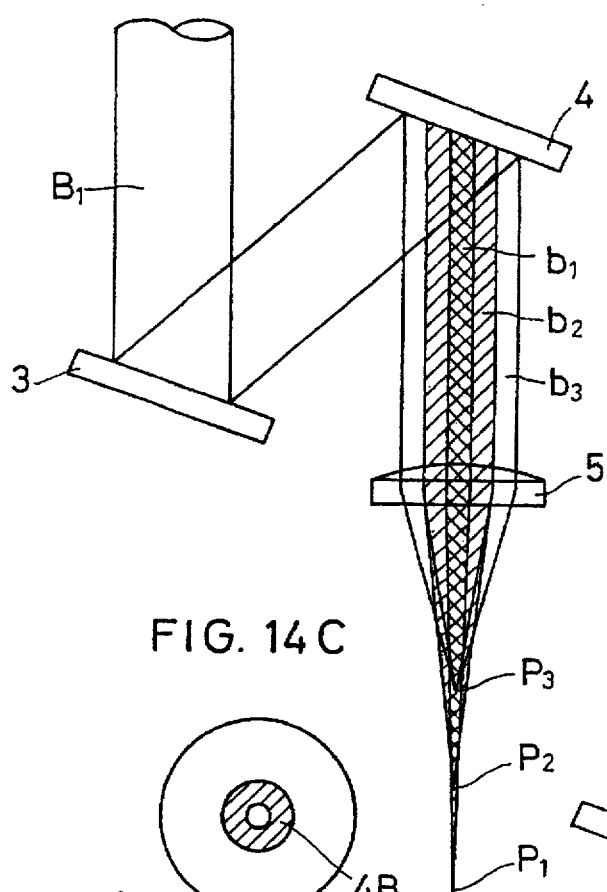
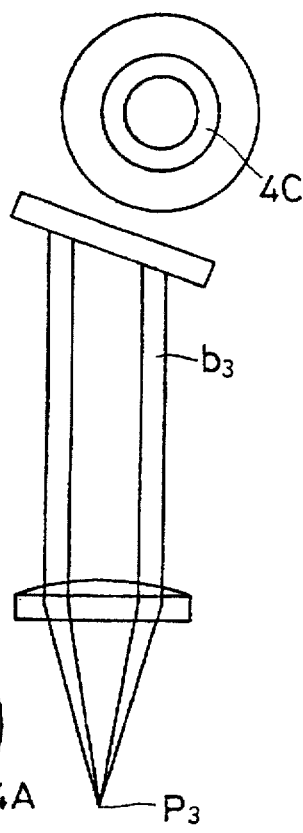
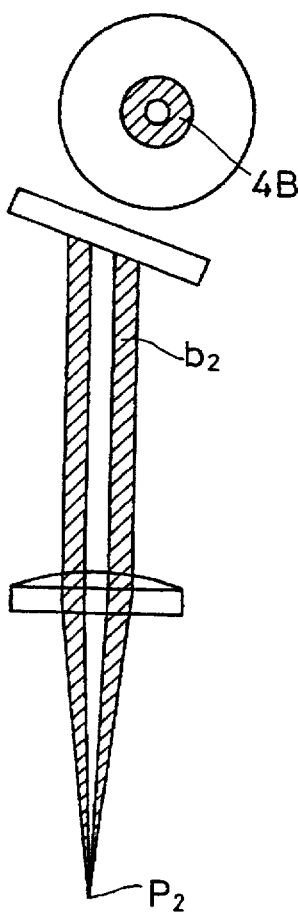
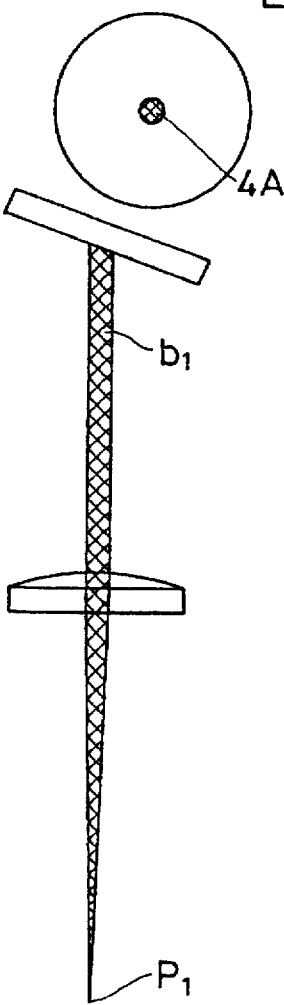

(凸)

Single-focus spinning

Multi-focus spinning

Single-focus scanning

Multi-focus scanning

OPTICAL DEVICE FOR LASER MACHINING

BACKGROUND OF THE INVENTION

This invention relates to an optical device for laser machining, more specifically an optical device having a multifocal converging optical system having the function of converging a single laser beam on a plurality of focal points.

Lasers such as $CO_2$ lasers and YAG lasers are used for cutting, welding and boring a workpiece by using a high-energy laser beam produced from an oscillator. An optical device used for such laser machining has a laser oscillator for producing a laser beam, a transmitter for guiding the laser beam produced by the oscillator into a machining head, and a converging optical unit provided in the machining head for converging and condensing the laser beam to a high energy density to irradiate a target area of the workpiece.

For such laser machining as cutting, welding and boring, a single, high-energy laser beam produced by the oscillator is ordinarily converged on a workpiece as it is. But now, many trials are being made to split a single laser beam into two or more beams and irradiate a workpiece with a plurality of split beams for versatility in machining.

For example, Unexamined Japanese Patent Publication 62-254991, "METHOD AND DEVICE FOR LASER WELDING", proposes to split a single laser beam into two beams. An object of this reference is to provide a method for laser welding which can deepen the weld penetration (keyhole). With this method, it is possible to increase the weld speed with small heat input, less thermal strain, and thus to protect the surrounding area from thermal effect.

The optical device used to carry out the method disclosed in this publication is shown in FIG. 22. It is a twin-spot laser welding machine comprising a laser oscillator ($CO_2$ laser) for producing a laser beam, a reflecting mirror 3 for reflecting the laser beam, and another reflecting mirror 4 for reflecting the laser beam again and at the same time splitting the laser beam into two beams so that these two beams will converge on two focal points laterally spaced from each other on the surface of the workpiece W.

A converging device for laser machining having the same object as that of the above reference is disclosed in Unexamined Japanese Patent Publication 4-182087. This device is structurally similar to the abovementioned device. Namely, this device has a bifocal mirror for converging a laser beam on two focal points laterally spaced from each other on the surface of the workpiece.

A different type of optical device is disclosed in an article titled "Dual-beam $CO_2$ laser cutting of thick metallic materials"(by P. A. Molian) in a technical literature called "Journal of Materials Science"(vol. 28, 1993, P 1738). In the arrangement disclosed in this article, instead of splitting a single laser beam into a plurality of beams and at the same time converging the split beams with a reflecting mirror provided in close proximity to the workpiece, two laser beams are produced from two laser devices, and these two beams are simply converged on two focal points. This optical device is shown in FIG. 23. It has two reflecting mirrors 4, which are simple plane mirrors, and a lens 5 provided between the mirrors 4 and the workpiece W for converging the two laser beams simply on two focal points.

It is stated in this article that a thick metallic material can be cut effectively by using two laser beams instead of one. But in this reference, in order to produce such two laser beams, two independent laser devices have to be used.

Unexamined Japanese Patent Publication 5-138385 discloses a method and a device for laser machining which are similar in its structure and object to the optical device disclosed in the abovementioned article. But this device differs in that a plurality of laser beams are converged on a plurality of focal points that are aligned in the direction of thickness of the workpiece W (along the optical axis of the laser beams). For this purpose, a lens 5 (FIG. 24) or a reflecting mirror (FIG. 25) is provided near the workpiece W.

As will be apparent from the above discussion, the technique of converging two or more high-energy laser beams on respective focal points is now widely accepted as an effective way to form a deep cut or weld penetration in a workpiece.

A plurality of laser beams may be converged on focal points that are arranged along a line perpendicular to the axis of the laser beams or along the optical axis.

Heretofore, a single converging mirror or lens had both the function of splitting a single laser beam into a plurality of beams and the function of converging the split beams on focal points. Such a multifocal optical unit, i.e. a lens or a mirror having both of these functions, is very difficult to manufacture because its manufacturing tolerance is extremely narrow, and thus the manufacturing cost is extremely high.

Another problem is that this optical unit, which has to be provided in front of the workpiece, tends to be damaged or polluted by plasmatic particles and debris scattered from the workpiece during machining.

In order to prolong the life of the optical unit, various measures were taken to protect it from such particles and debris. But none of them were satisfactory. Namely, optical units of this type had to be frequently replaced with new ones because they are easily damaged or polluted. As mentioned above, these optical units are very expensive, so that the maintenance cost of the entire device and thus the machining cost are high.

SUMMARY OF THE INVENTION

An object of this invention is to provide an optical device for laser machining wherein a means for splitting a laser beam is provided separately from the means for converging the split laser beams on predetermined focal points so that the optical unit provided in close proximity to the workpiece can be manufactured with not so high accuracy and thus at low cost, and can thus be replaced with a new one at low cost.

According to this invention, there is provided an optical device for laser machining comprising a laser oscillator, a transmitter means for transmitting a laser beam produced by the laser oscillator, and a converging means for converging the laser beam received from the transmitter means on a plurality of focal points. The converging means comprises a laser beam splitting unit for splitting the laser beam into a plurality of beams, and a converging unit for converging the split beams on the surface of a workpiece. The laser beam splitting unit is provided separately from and upstream of the converging unit.

In order to converge the split laser beams on focal points that are arranged on the surface of the workpiece in a plane perpendicular to the optical axis, the laser beam splitting unit may be formed from a plurality of splitting members separated from each other by straight lines.

The laser beam splitting unit may be a reflecting mirror having a plurality of flat reflecting mirror members.

Each flat reflecting mirror member may be arranged so as to be inclinable in a predetermined direction, independently of the other reflecting mirror members.

Also, the laser beam splitting unit comprising the reflecting mirrors may be supported so as to be movable in a predetermined direction.

Further, it may be mounted so as to be rotatable about its center.

As another means for converging the split laser beams on focal points arranged in a plane perpendicular to the optical axis, the splitting unit may be a splitting window.

The splitting window may be arranged so as to be movable in a predetermined direction or rotatable about its center, or more preferably both movable in a predetermined direction and also rotatable about its axis.

In order to arrange the focal points along the optical axis, the laser beam splitting unit may comprise a plurality of splitting members arranged concentrically around the optical axis of the laser beam.

Such splitting members may be a combination of concave, convex and plane reflecting mirrors that are arranged concentrically so as to form a reflecting mirror.

Otherwise, they may be a combination of concave, convex and plane transparent members that are arranged concentrically so as to form a reflecting window.

According to the present invention, the laser beam is split into a plurality of beams in the machining head. It is either split along parallel or radial lines or concentrically. In the former case, the split laser beams converge on focal points arranged on the surface of the workpiece in a plane perpendicular to the optical axis of the laser beams. In the latter case, the focal points are arranged along the optical axis. By converging split laser beams on a plurality of focal points, the energy density can be distributed differently from when converging a single laser beam on a single focal point. Thus, it is possible to use this technique in a variety of laser machining applications.

The laser beams split by the beam splitting unit in either of the abovementioned two ways are guided to a single-focus converging unit, kept close to each other. Since these beams differ in incident angle and/or diverging angle from one another, they converge on different focal points even though the converging unit itself is a single-focus unit.

Laser beam splitting units can be manufactured more easily than multifocal converging units. Further, since the splitting unit is provided upstream of the converging unit, it will never be polluted or damaged by molten debris and vapor scattering from the workpiece. Thus, this unit need not be replaced so frequently. This leads to a reduction in the initial setup cost and maintenance cost of the entire optical device.

Let us now describe in more detail various advantages of converging laser beams on a plurality of focal points. First, we will describe the arrangement in which laser beams are converged on focal points arranged in a plane perpendicular to the optical axis. By converging two laser beams on two focal points as shown in FIG. 18A, it is possible to cut or weld the workpiece with the first beam and then cut or weld it further deeply with the second beam (keyhole effect). By converging beams as shown in FIG. 18B, it is possible to eliminate the necessity of butting two workpieces together with high accuracy when butt-welding them. By converging four beams on four focal points as shown in FIG. 18C, both the above effects are achievable. Also, as shown in FIGS. 19A, 19B, laser beams may be converged on a plurality of focal points to form a plurality of patterns of the same shape.

By arranging the focal points on a plane perpendicular to the optical axis, one-dimensional machining of the workpiece is easy. But for actual two- or three-dimensional machining, however, it is necessary, according to the machining direction, to rotate the focal points without changing their relative positions, though this is not necessary if the focal points are arranged along the optical axis. In this case, according to the present invention, the reflecting mirror or window for splitting a laser beam is rotated as shown in FIGS. 21A (see fc), 21B. But it was impossible to rotate the focal points by rotating the conventional multifocal converging unit.

By rotating the focal points at a sufficiently high speed, the workpiece can be machined in a "multifocal beam spinning" pattern as shown in FIG. 21C. The advantage of this type of machining is that the laser beam energy can be efficiently supplied to the workpiece because the focus of the beams is sufficiently dense even with the same spinning frequency.

Beam scanning as shown in FIG. 21D is also possible by pivoting the reflecting mirrors or windows (as shown by arrows fd in FIG. 21A) with a galvanometer.

One advantage of arranging the focal points along the optical axis is, as explained in Unexamined Japanese Patent Publication 5-138385, that a thick plate can be machined efficiently. As shown in FIG. 20A, a converging unit having too short a focal length is not suitable for the machining of a thick plate because its focal depth L is too short, though the laser beams can be focused on sufficiently small spots $\phi$. However, as shown in FIG. 20B, a converging unit having too long a focal distance is also not desirable, because such a unit cannot focus laser beams on sufficiently small spots, though its focal depth L is sufficiently long. Thus, according to this invention, the focal points are arranged along the optical axis as shown in FIG. 20C so that laser beams are focused on sufficiently small spots $\phi$, while keeping a sufficiently long focal depth L'. With this arrangement, it is possible to machine a rather thick plate member and also to machine a workpiece even if its positioning accuracy is not very high (e.g. even if the workpiece moves in the direction of the optical axis). Namely, with this arrangement, it is possible to machine the workpiece properly even if the focal points move relative to the workpiece.

In order to arrange the focal points along the optical axis of the laser beam, a reflecting mirror comprising concentrically arranged mirror segments or a window comprising a concentrically arranged transparent members is used. Such a mirror or window can be manufactured at low cost.

BRIEF DESCRIPTION OF THE DRAWINGS

Other features and objects of the present invention will become apparent from the following description made with reference to the accompanying drawings, in which:

FIG. 14A is a schematic sectional view of a tenth embodiment;

FIGS. 14B, 14C and 14D are partial detailed views of the tenth embodiment;

DETAILED DESCRIPTION OF THE PREFERRED EMBODIMENT

Embodiments of this invention are described with reference to the drawings.

Figure 1:
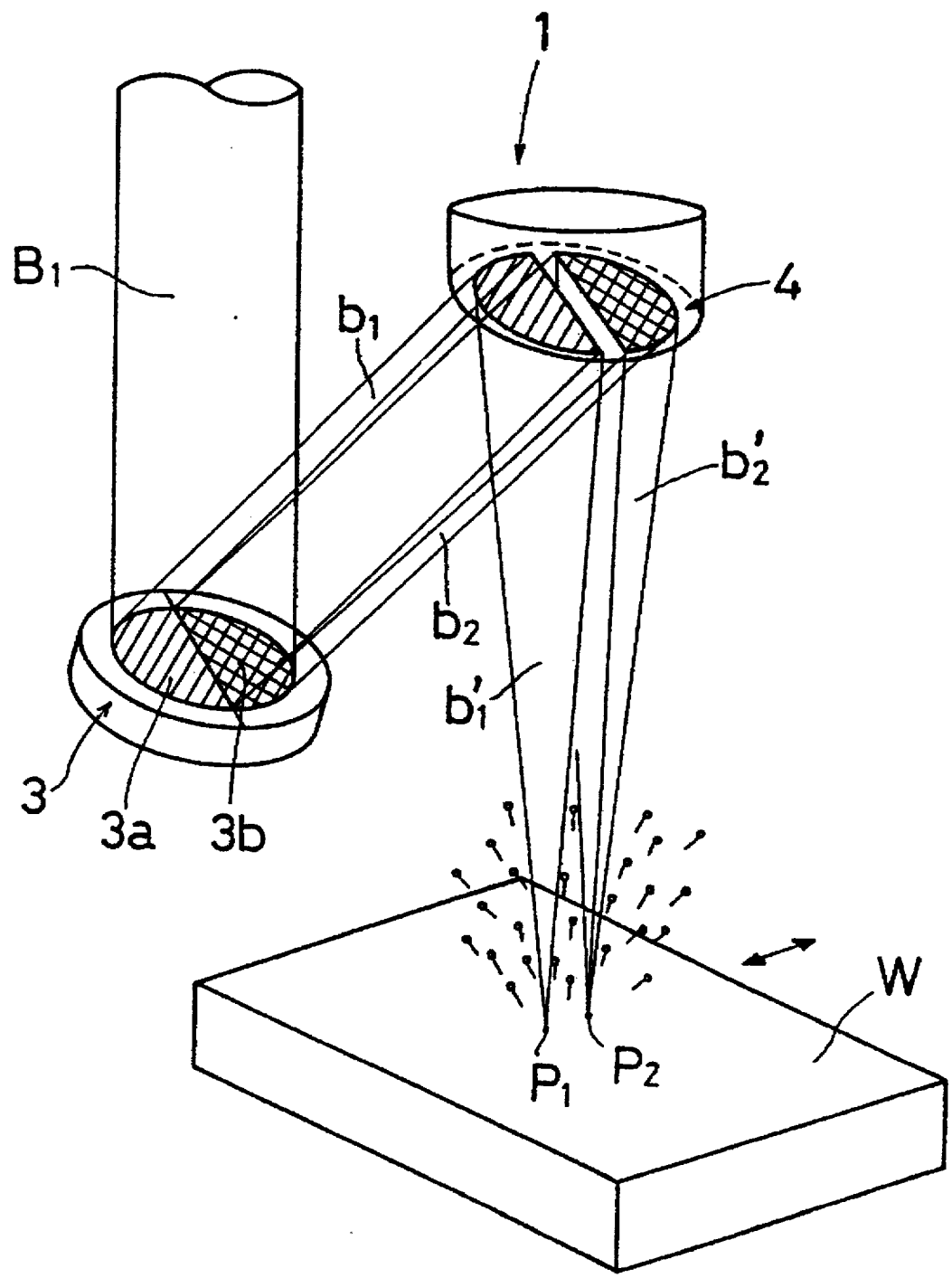
FIG. 1 is a schematic perspective view of a machining head of an optical device of a first embodiment.

FIG. 1 is a schematic perspective view of a machining head of the first embodiment. While not shown, the optical device for laser machining of this embodiment has an oscillator for generating a high-energy laser such as a $CO_2$ laser, and a transmitter for transmitting the laser beam produced to the machining head. We omitted them in the drawings because they are well-known in the art.

An optical element called "window" is provided at a point where the laser beam B transmitted through the transmitter enters the machining head 1, though it is not shown, either. This window serves to prevent molten pieces and vapor produced from the workpiece from entering into the laser beam path, and to seal gas pressure in the machining head.

The laser beam B1 introduced into the machining head 1 is reflected by a reflecting mirror 3 in an oblique direction. It is a multisegment reflecting mirror for reflecting the laser beams B1 into two beams. Namely, the reflecting mirror 3 comprises two semicircular flat mirrors 3a, 3b that are disposed in two different planes intersecting at a predetermined angle so as to split the laser beam B1 into two beams. The semicircular mirrors 3a and 3b are mounted so as to be pivotable independently of each other.

The two beams b1, b2 split and reflected by the reflecting mirror 3 are reflected again by another reflecting mirror 4 which is arranged so that the beams b'1 and b'2 reflected by it are converged on focal points P1 and P2, respectively, on the workpiece W. The workpiece is thus machined by the laser beams. The reflecting mirror 4 is an ordinary single-focus paraboloidal concave mirror. It is arranged so that the focal points P1 and P2 are located on separate points on the surface of the workpiece W.

The machining head 1 has a case (not shown) accommodating the window and reflecting mirrors 3 and 4 and provided at its end with a nozzle complementary in shape to the shape of the laser beams b'1, b'2 projected by the mirror 4. The workpiece is machined with the laser beams b'1 and b'2 while jetting from the nozzle a high-pressure assist gas ($O_2$ gas for cutting; inert gas (such as $N_2$ and He) for welding) which is introduced from one side of the case.

Figure 2A:
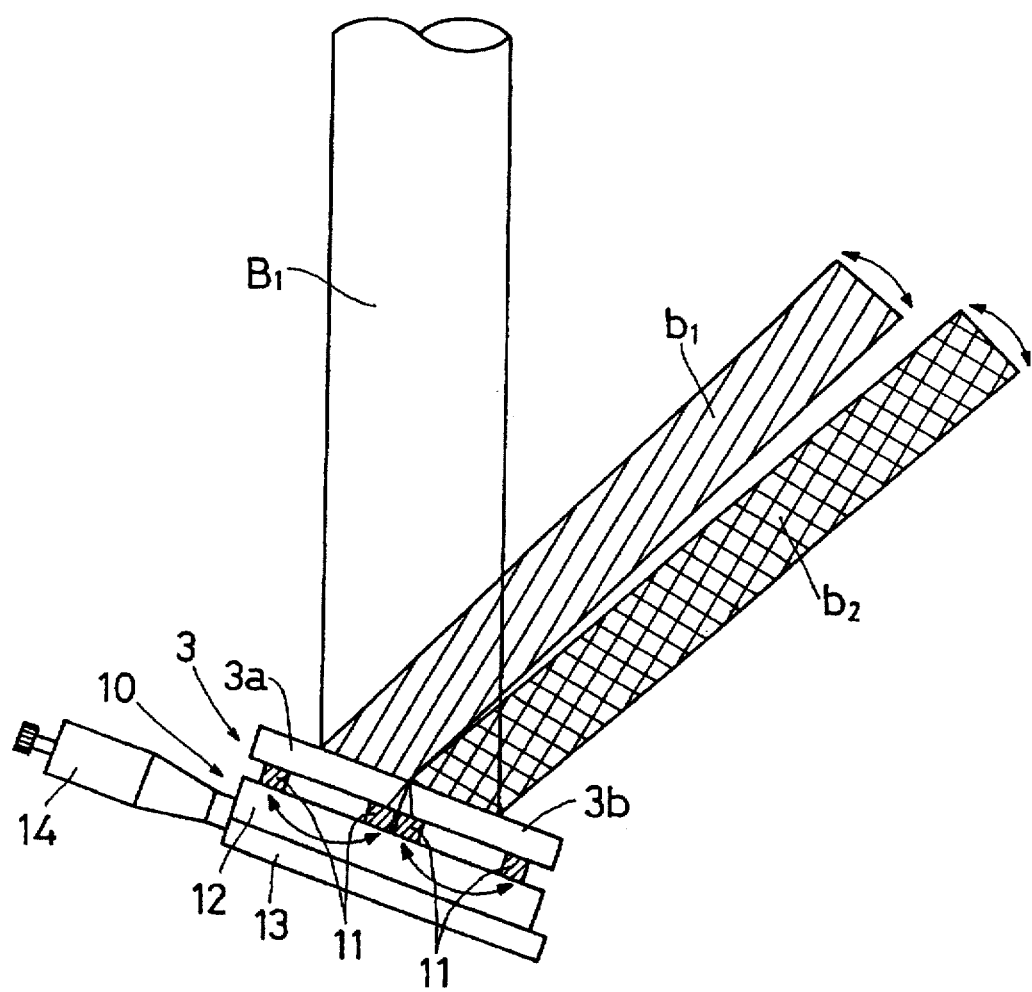
FIGS. 2A and 2B are detailed views of the same.

Referring to the enlarged sectional view of FIG. 2A, the reflecting mirror 3 is supported on a base plate 10 through a plurality of piezoelectric elements 11. The semicircular mirrors 3a and 3b are pivoted, independently of each other, in the directions of arrows by the piezoelectric elements 11. Namely, by applying a direct current to selected ones of the elements 11, they expand or shrink vertically, so that the semicircular mirrors 3a, 3b are pivoted by small angles.

The base plate 10 comprises a sliding plate 12 and a fixed plate 13, and has a micrometer 14 at one end thereof. By activating the micrometer 14, the sliding plate 12 slides on the fixed plate 13, so that the reflecting mirror 3 shifts relative to the optical axis of the laser beam B. Thus, it is possible to change the ratio of reflectance between the beams b'1 and b'2 reflected by the semicircular mirrors 3a and 3b.

In this embodiment, the base plate 10 is fixed to the case of the machining head. But preferably, it should be mounted on a rotary plate which can be rotated by any desired angle by a driving means such as a motor. It is possible to change the machining direction or to carry out beam spinning by turning the base plate 10.

Figure 2B:
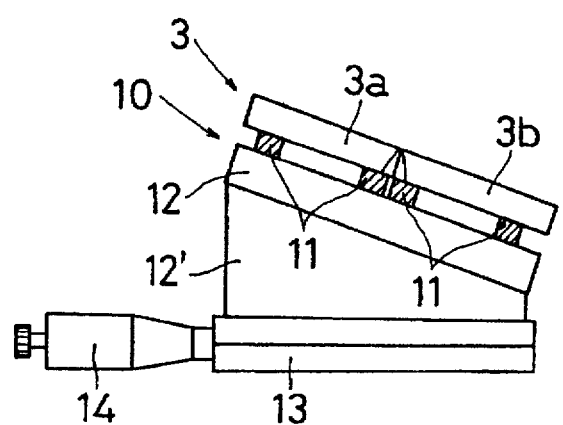

FIG. 2B shows a different means for moving the base plate 10. In this example, the sliding plate 12 is integrally mounted on a sliding base 12' having a triangular section. The base 12' is slidably mounted on the fixed plate 13.

Now the operation of the first embodiment is described.

In the machining head 1, the laser beam B1 is separated and reflected in two different directions as the two beams b1 and b2. They are then reflected by the reflecting mirror 4 so they will converge on the focal points P1 and P2 on the surface of the workpiece W.

Figure 3A:
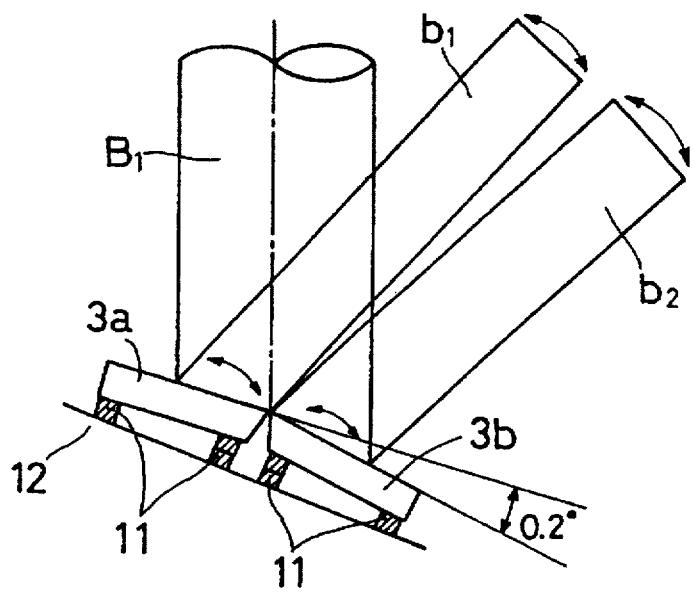
FIGS. 3A and 3B are views explaining the operation of the machining head of the first embodiment.

In order to split the laser beam B1 into two beams with the reflecting mirror 3, as shown in FIG. 3A, the semicircular mirrors 3a, 3b are inclined by an angle of e.g. about 0.2 degrees relative to each other by applying a high voltage to the piezoelectric elements 11 provided near the borderline between the semicircular mirrors 3a and 3b to expand them.

Figure 3B:
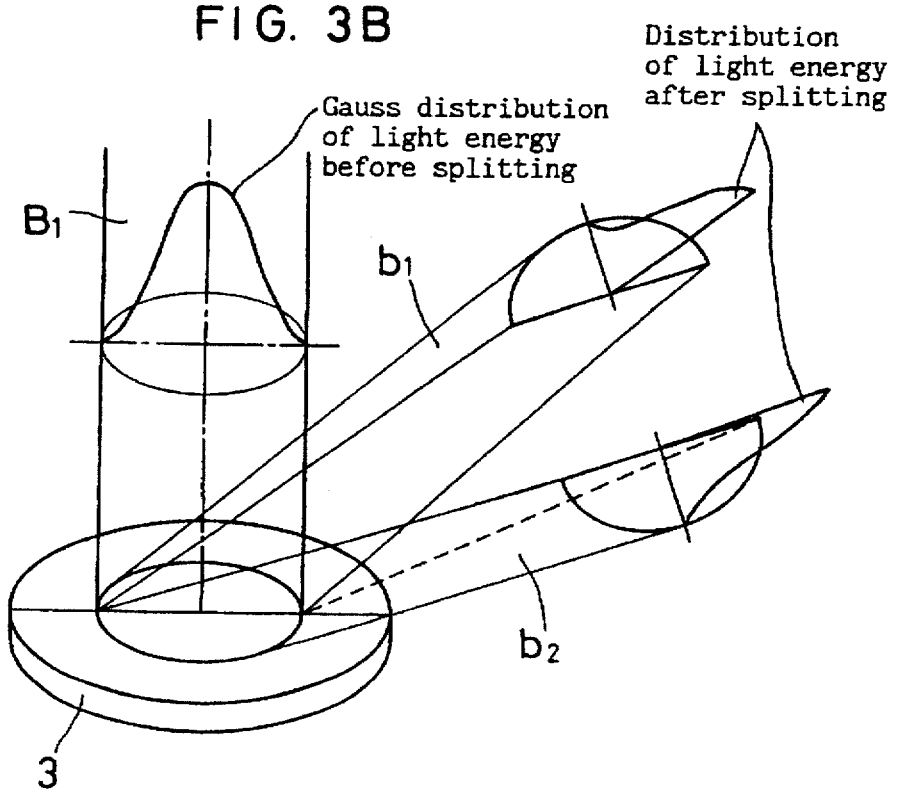

In the embodiment shown, the laser beam B1 is directed so that its optical axis will pass precisely the center of the effective reflecting surface of the reflecting mirror 3. Thus, the two reflected laser beams b1 and b2 have the same energy distribution as shown in FIG. 3B.

When welding the workpiece W by irradiating it with the laser beams b'1 and b'2 having the same energy distributions (though they may have different distribution), the workpiece W is moved in the direction of the arrow in FIG. 1 so as to weld it with the beam converged on the focal point P2 first, and then finish-weld the same area with the beam converged on the focal point P1 for perfect welding.

During welding, dust, molten debris and vapor coming from the workpiece W will be scattered in the machining head, so that the reflecting mirror 4, provided in close proximity to the workpiece W, will be damaged or polluted to such an extent that it has to be replaced with a new one. But the reflecting mirror 4 used in this embodiment is so simple in structure, being in the form of a single paraboloidal concave mirror, that it is inexpensive in comparison with a conventional one having both splitting and converging functions. Thus, the expenses for replacement of such reflecting mirrors are kept to a minimum.

Heretofore, a laser beam was split and converged using reflecting mirrors whose reflecting surfaces were immovable. Thus, it was impossible to the change the beam splitting ratio and the converging points, or to rotate the converging points. With the arrangement of the embodiment, all of the above three adjustments are possible.

Figure 4A:
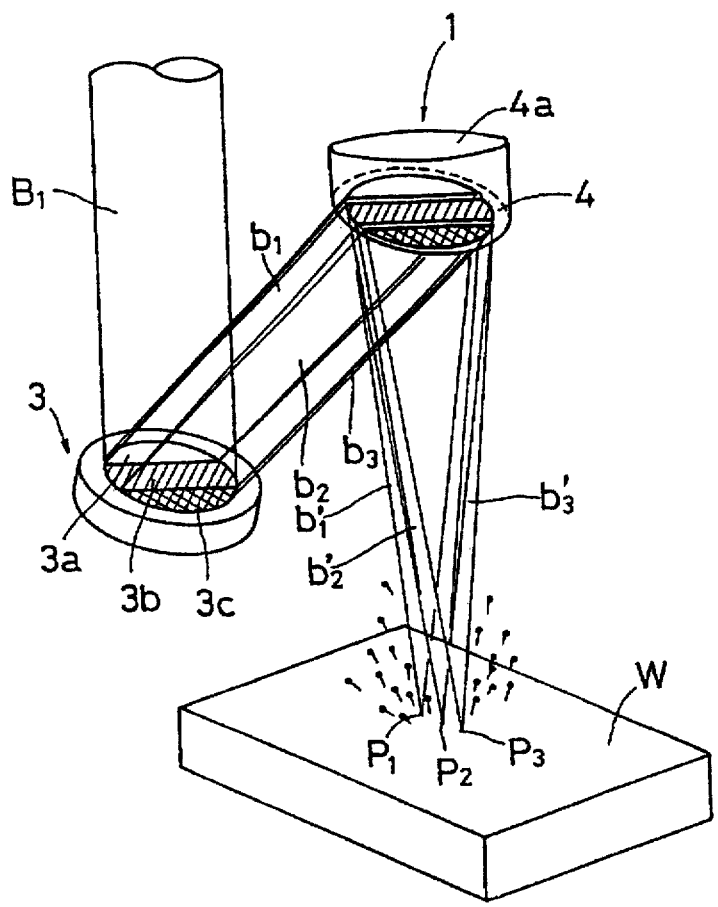
FIG. 4A is a schematic perspective view of a second embodiment.
Figure 4B:
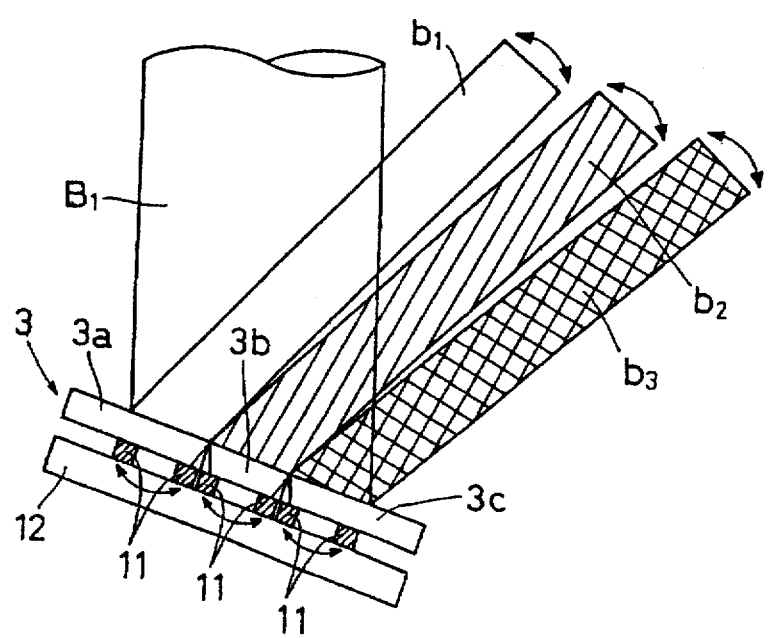
FIG. 4B is a detailed sectional view of FIG. A.

FIGS. 4A and 4B show the machining head of the optical device of a second embodiment and its partial enlarged view. This embodiment differs from the first embodiment only in that the laser beam B1 is split into three beams. For this purpose, the reflecting mirror 3 is divided into three parts 3a, 3b and 3c along two parallel lines.

The unillustrated main components (such as the laser oscillator and the beam transmitter) of the optical device and the means for moving and rotating the reflecting mirror 3 are identical in structure to those in the first embodiment.

In this embodiment, the reflecting mirror is divided into three parts along two parallel lines. But it may be divided into four, five or more parts.

Figure 5A:
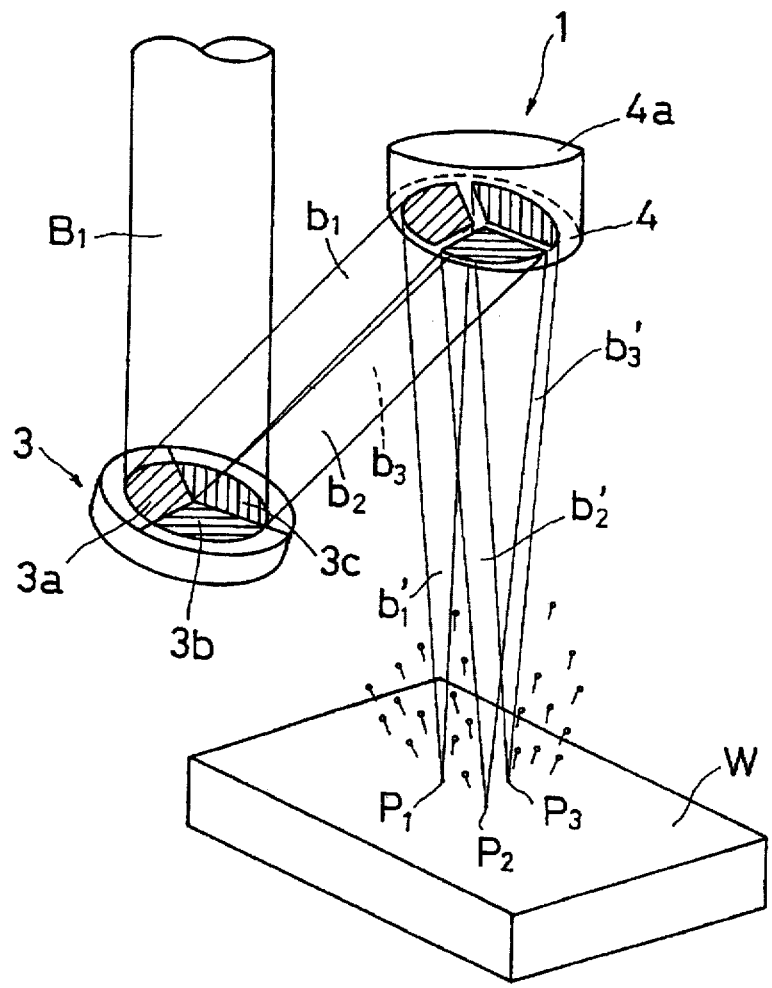
FIGS. 5A and 5B views of a third embodiment.
Figure 5B:
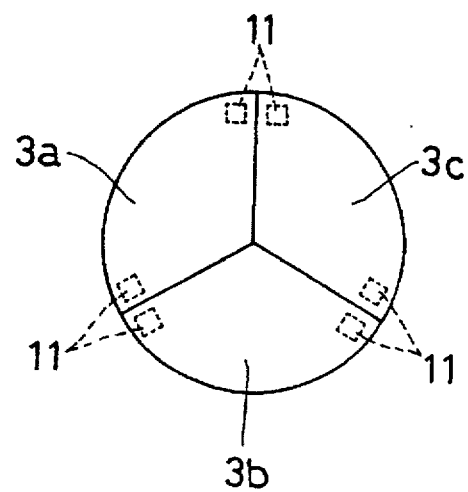

FIGS. 5A and 5B are schematic views of the machining head of a optical device of the third embodiment and its reflecting mirror (plane mirror). It is to be understood that the optical devices of this and the subsequent embodiments up to the sixth embodiments have the main components and adjusting means the same as or similar to those of the first embodiment, unless otherwise stated. This embodiment differs from the second embodiment in that the reflecting surface of the reflecting mirror 3 is divided into three equal sectors 3a, 3b and 3c along three radial lines (FIG. 5B).

Thus, while the focal points P1, P2 and P3 are arranged along a straight line in the second embodiment, they are arranged at the vertexes of a triangle in the third embodiment. The positions of the focal points P1, P2 and P3 are adjustable relative to one another. Since the three focal points P1, P2 and P3 are arranged to form a triangle, the optical device of this embodiment is especially suited for such machining work as boring, spinning and beam scanning.

Figure 6A:
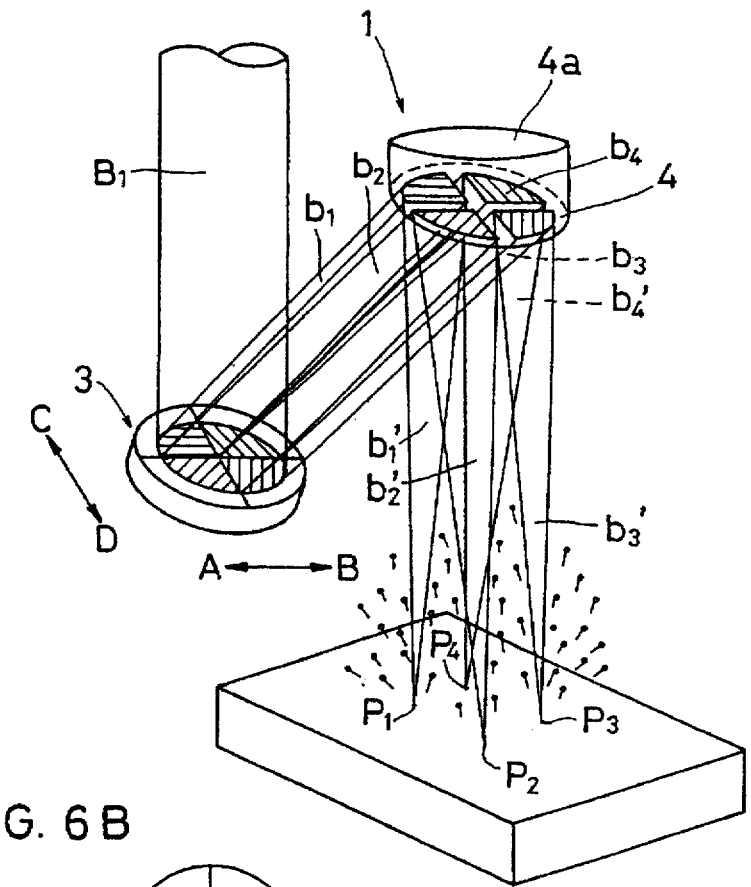
FIGS. 6A and 6B are views similar to FIGS. 5A and 5B of a fourth embodiment.
Figure 6B:
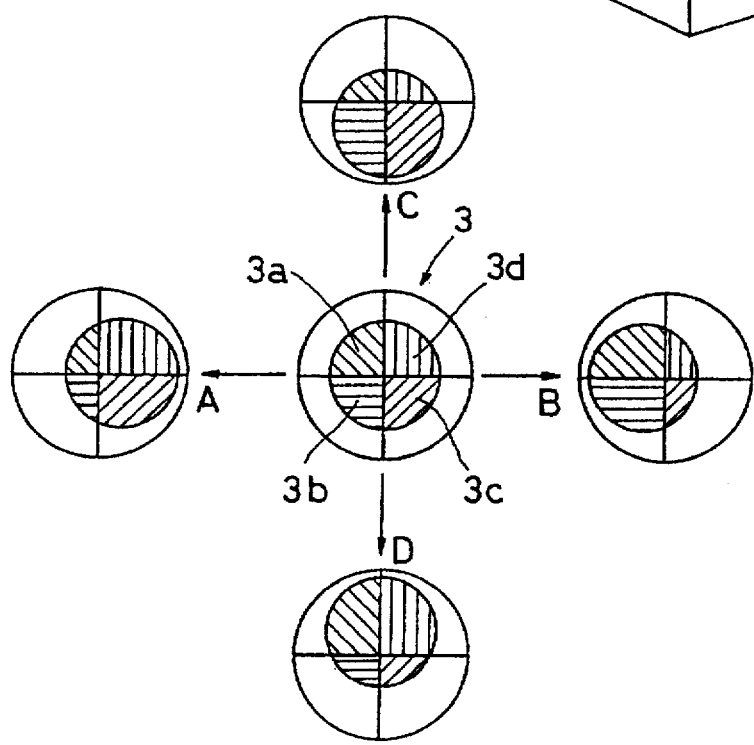

FIGS. 6A, 6B schematically show the machining head of the optical device of the fourth embodiment. In this embodiment, similar to the embodiment of FIG. 5, the reflecting surface of the reflecting mirror 3 is divided into a plurality of equal sectors having the same central angles. Namely, in this embodiment, the surface of the reflecting mirror 3 is divided into four equal sectors 3a, 3b, 3c and 3d along four radial lines so as to split the laser beam B1 into four laser beams b1, b2, b3 and b4.

Referring to FIG. 6B, if the reflecting mirror 3 is positioned so that the optical axis of the laser beam B2 passes the center of the reflecting mirror, the laser beam is split into four equal beams. By moving the reflecting mirror 3 up or down (C, D), or right or left (B, A), the above ratio can be changed freely.

In the other embodiments, too, it is possible to change this rate by moving the reflecting mirror 3.

It is of course possible to divide the reflecting mirror into more than four segments along radial lines.

Figure 7:
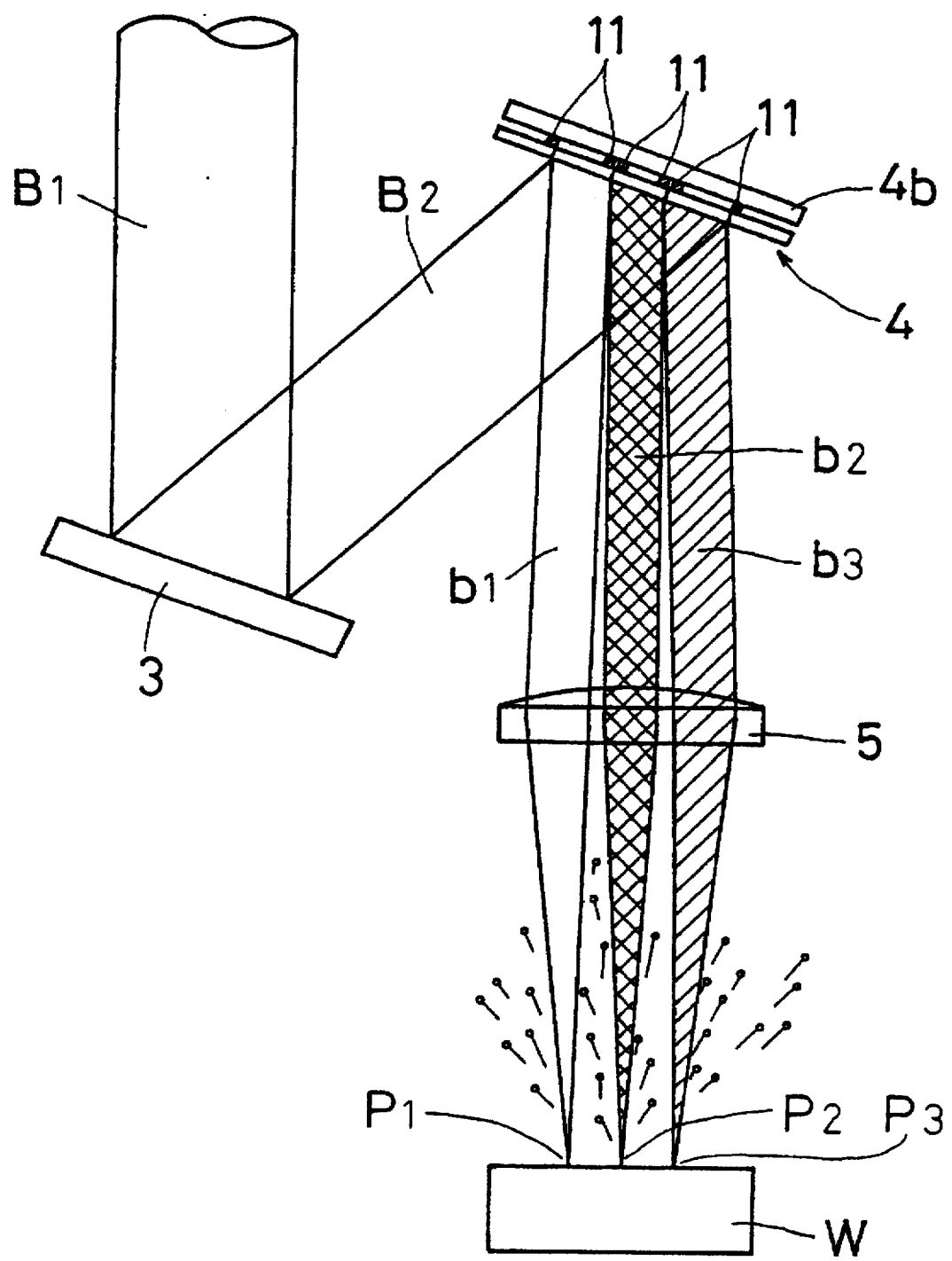
FIG. 7 is a schematic perspective view of a fifth embodiment.

FIG. 7 schematically shows the machining head of the optical device of a fifth embodiment in which the reflecting mirror 3 is an ordinary plane mirror. The laser beam B1 is reflected by the mirror 3, and the beam B2 thus reflected is split into a plurality of (three in this embodiment) beams by another reflecting mirror 4 in the same way as with the reflecting mirrors 3 in the first to fourth embodiments.

As in the second embodiment, the reflecting mirror 4 has its reflecting surface divided into three segments 4a, 4b, and 4c along two parallel lines. These segments have only the function of splitting and reflecting the laser beam. The reflecting mirror 4 has its back supported on a base plate 10 through a means 11 for adjusting the inclination of the segments 4a, 4b and 4c.

The split laser beams b1, b2 and b3 pass through a condensing or converging lens 5 and converged on focal points P1, P2 and P3 on the surface of the workpiece W.

In this embodiment, similar to the first to fourth embodiments, the function of splitting the laser beam and the function of converging the split beams are provided separately from each other. Namely, the laser beam is first split into a plurality of beams by the reflecting mirror 4, and then passes through the condensing lens 5.

Figure 8:
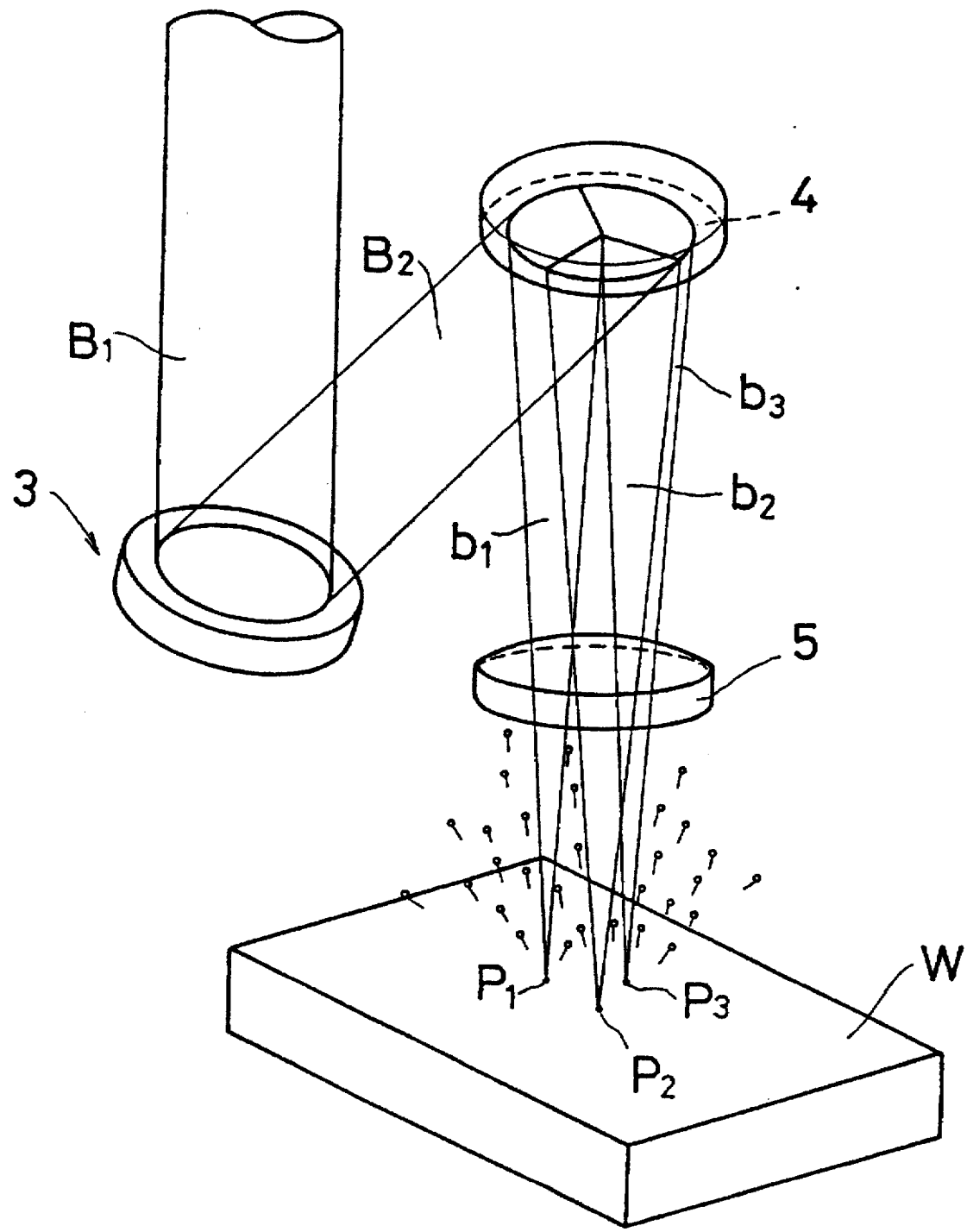
FIG. 8 is a schematic perspective view of a sixth embodiment.

FIG. 8 schematically shows a machining head of the sixth embodiment, which is a modified embodiment of the fifth embodiment shown in FIG. 7 and differs therefrom in the way in which the laser beam B2 is split into three laser beams b1, b2 and b3 by the reflecting mirror 4. Namely, the reflecting mirror 4 in this embodiment split the laser beam along radial lines extending radially from the center of the reflecting mirror 4. Thus, the split beams are converged on focal points P1, P2 and P3 that are disposed at the vertexes of a triangle.

The split laser beams b1, b2 and b2 reflected by the reflecting mirror 4 are converged on the focal points P1, P2 and P3 by the same condensing lens 5 used in the embodiment of FIG. 7.

Figure 9:
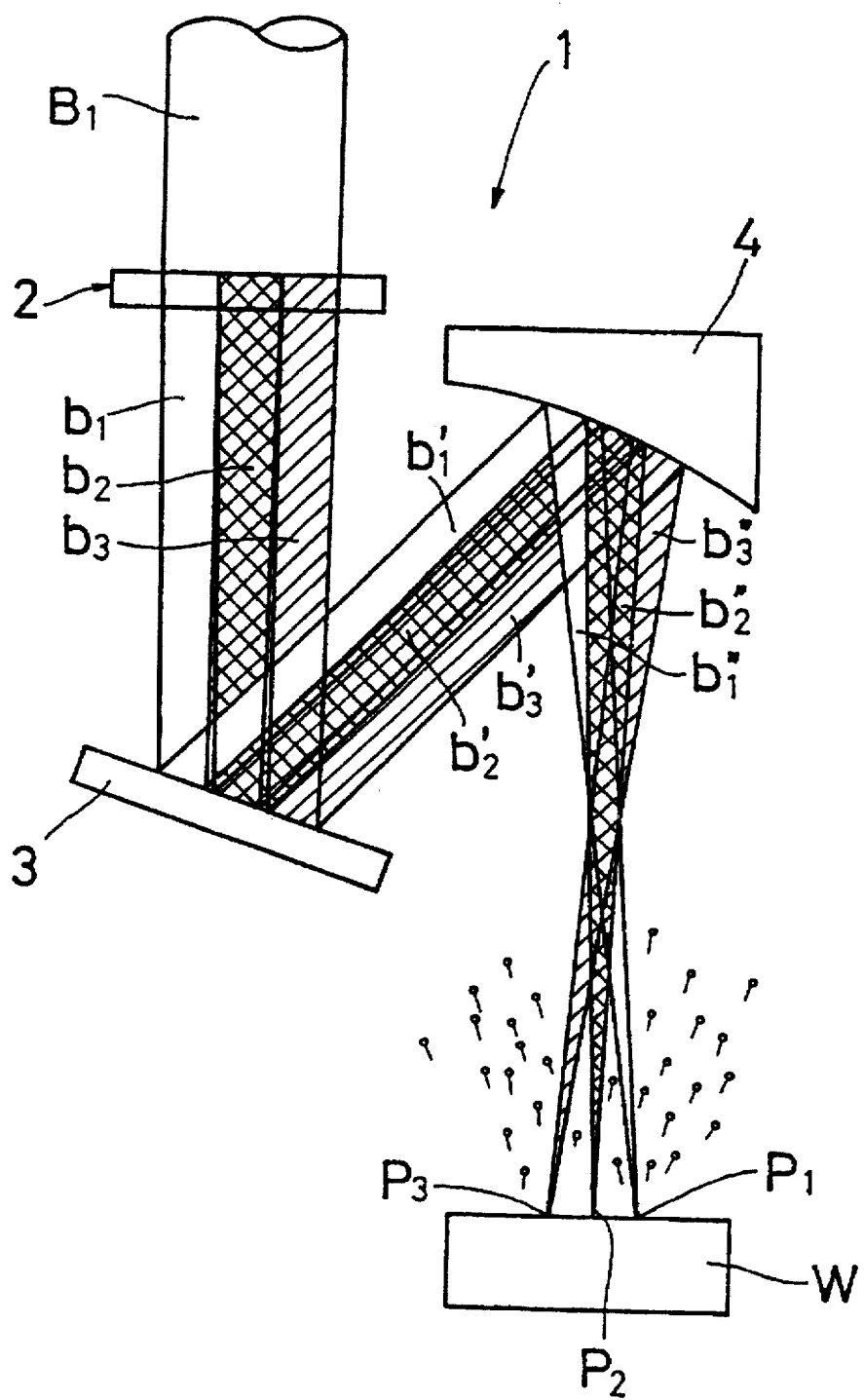
FIG. 9 is a schematic perspective view of a seventh embodiment.

FIG. 9 is a schematic sectional view of a machining head of the seventh embodiment. In this embodiment, the laser beam B1 is split into a plurality of (three in the embodiment) beams by a window 2 provided at the laser beam inlet of the machining head, reflected by a single flat reflecting mirror 3, and reflected by another reflecting mirror 4 having a single paraboloidal surface so as to be converged on focal points P1, P2 and P3 on the surface of the workpiece W.

In this embodiment, the window 2 has the function of splitting the laser beam, while the reflecting mirror 3 is a single, flat reflecting mirror. The single paraboloidal reflecting mirror 4 has only the function of reflecting and converging the split beams. Of these three members, the window 2 is provided farthest from the workpiece W, so that there is little possibility that the window 2 can be polluted or damaged by any debris or dust scattered from the workpiece W during machining.

Figure 10A:
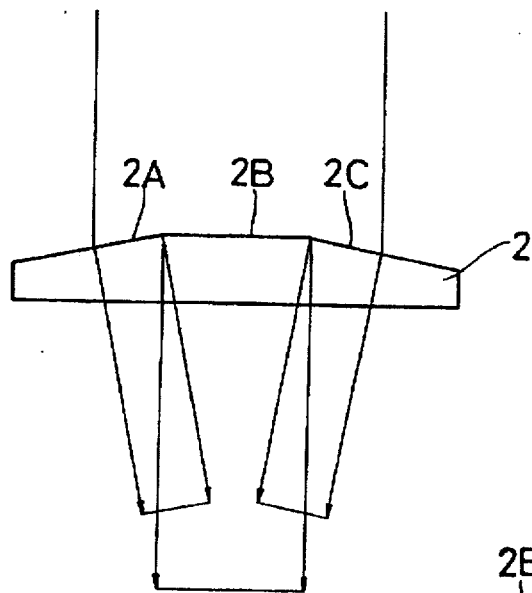
FIGS. 10A-10C are detailed views of a window of a machining head of the seventh embodiment.
Figure 10B:
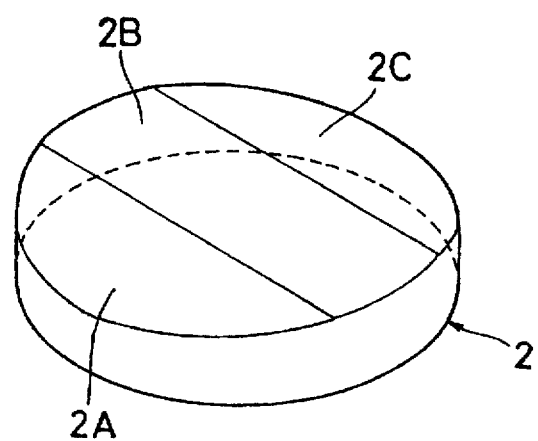
Figure 10C:
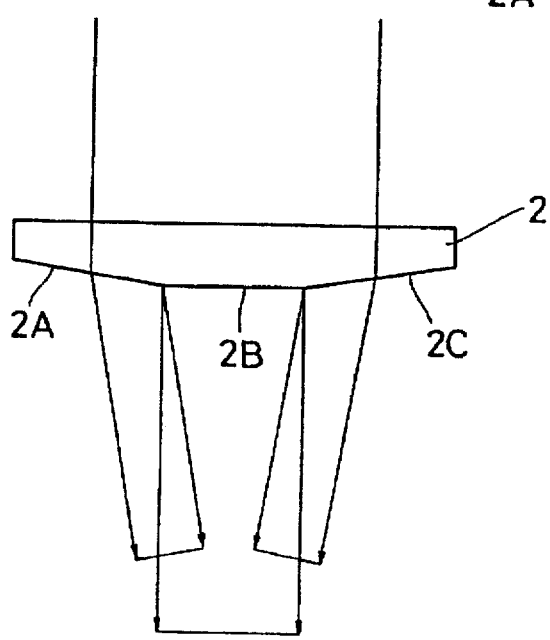

FIGS. 10B, 10A' and 10C show, in section and in perspective, the shape of the window 2 of this embodiment. First, referring to FIG. 10A, the window 2 is divided into an inclined surface 2A, a horizontal surface 2B and an inclined surface 2C along two parallel, straight lines. FIG. 10B clearly shows how they are arranged. As shown in FIG. 10C, these surfaces may be formed on the opposite side of the window.

This window 2 of this embodiment may be mounted so as to be movable in a predetermined direction and rotatable about its center as in the first embodiment. In this case, the window 2 may be supported on a holder (not shown) moved by a micrometer similar to the micrometer in the first embodiment. Also, the holder may be rotated with a motor which can rotate the holder by a very small angle, such as a stepping motor.

Figure 11:
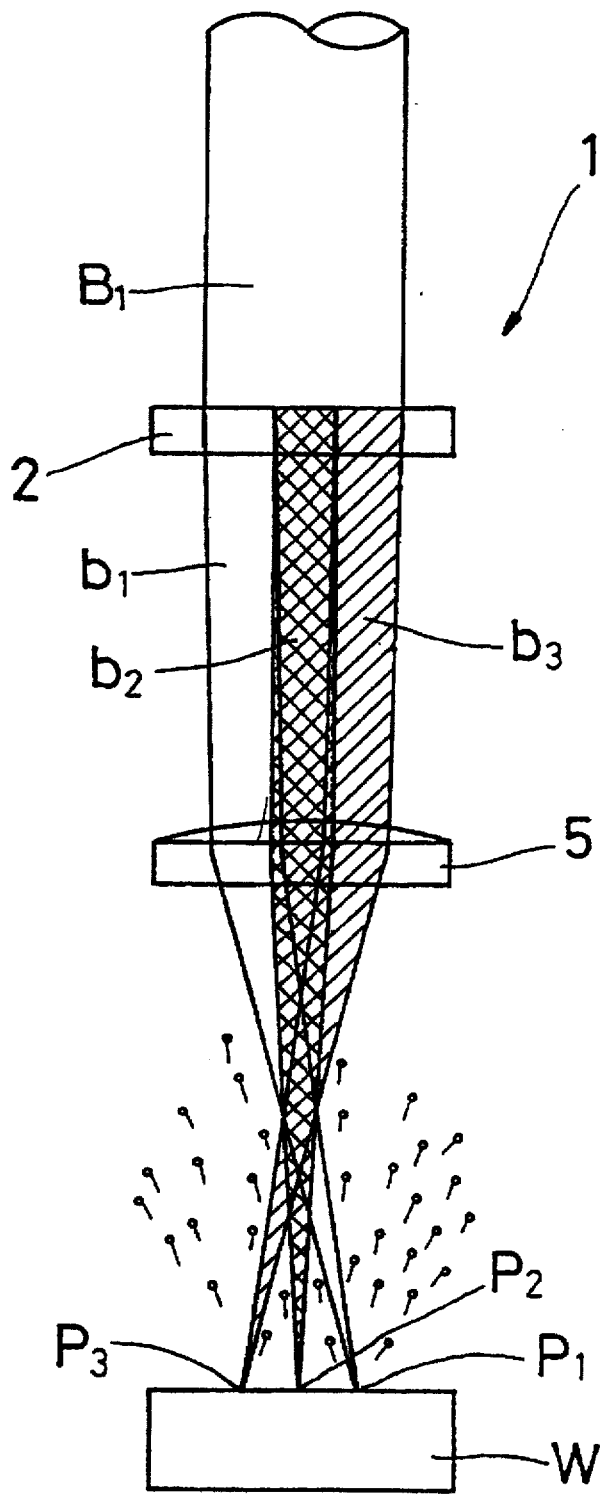
FIG. 11 is a schematic perspective view of an eighth embodiment.

FIG. 11 is a schematic sectional view of the machining head of a eighth embodiment. As shown, no reflecting mirror is used in this embodiment. Instead, the laser beam B1 is split into a plurality of beams b1, b2 and b3 by a window 2 which is not a plane light-passing window but a window having three sections that pass light in different directions.

The split beams are converged on focal points P1, P2 and P3 by a condensing lens 5. Namely, the condensing lens has no function of splitting the laser beam.

As will be apparent from the above description, in this embodiment, like the other embodiments, the function of splitting the laser beam and the function of converting the split beams on focal points are provided separately from each other. Thus, the window 2, provided farther from the workpiece, is far less likely to be polluted or damaged than the condensing lens 5.

Figure 12:
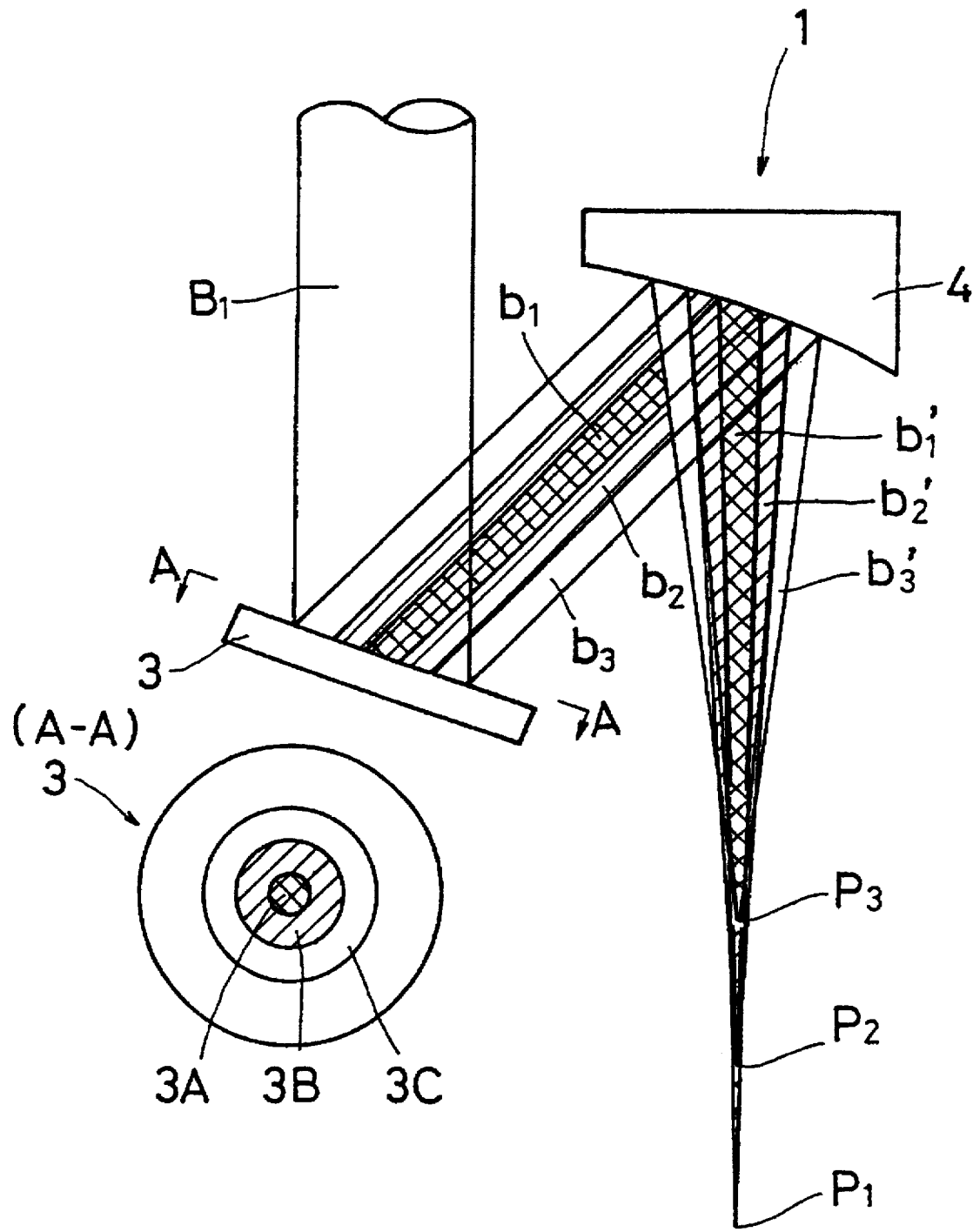
FIG. 12 is a schematic sectional view of a ninth embodiment.

FIG. 12 is a schematic sectional view of the machining head of the ninth embodiment. In the first through eighth embodiments, a split laser beams are converged on a plurality of focal points that are arranged laterally on the surface of the workpiece, i.e. along a line that is perpendicular to the optical axis of the beams. In sharp contrast, in this embodiment, the laser beam is split and converged on a plurality of focal points that are arranged axially along the optical axis of the beams.

Figure 13A:
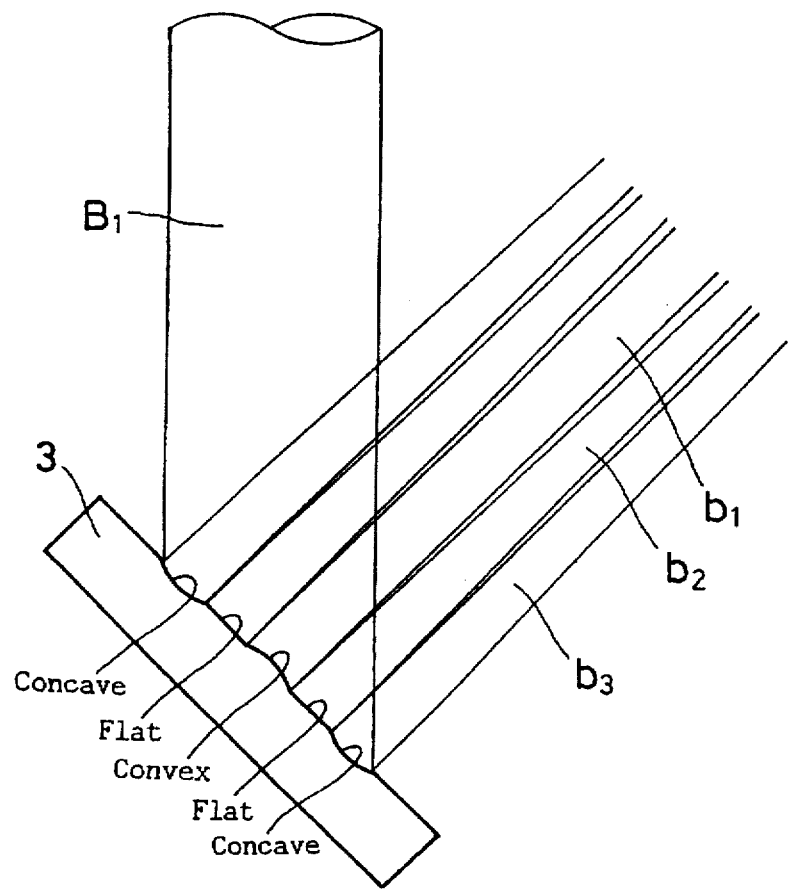
FIG. 13A and 13B are views explaining the operation of the ninth embodiment.
Figure 13B:
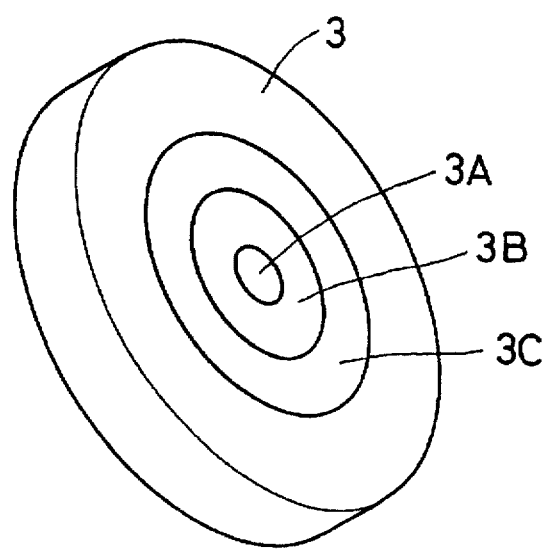

The laser beam B1 is reflected by a reflecting mirror 3. As shown in the sectional view taken along line A—A of FIG. 12, and FIGS. 13A and 13B, the reflecting mirror 3 comprises concentric segments 3A, 3B and 3C. In order for the respective segments to have focal points P1, P2 and P3 shown in FIG. 12, the innermost segment 3A, the intermediate one 3B and the outermost one 3C may have a convex surface, a flat surface, and a concave surface, respectively (FIG. 13A). These mirror segments are integral with each other.

The laser beam is reflected and split by the reflecting mirror 3 into laser beams b1, b2 and b3, which are reflected again by another reflecting mirror 4. The thus reflected beams b'1, b'2 and b'3 converge on focal points P1, P2 and P3, respectively.

Thus, in this embodiment, like the other embodiments, the function of splitting the laser beam and the function of converging the split beams on focal points are provided separately from each other. The reflecting mirror 3, provided farther from the workpiece, is far less likely to be polluted or damaged than the reflecting mirror 4.

The diameters of the laser beams b1 and b3, which reflect from the convex and concave surfaces of the reflecting mirror 3, slightly increase and decrease as they go away from the mirror 3. In FIG. 13A, such increase and decrease in diameters are shown in a rather exaggerated manner.

FIG. 14A is a schematic sectional view of the machining head of a tenth embodiment and FIGS. 14B–14D are its partial exploded views. In this embodiment, two flat or substantially flat reflecting mirrors 3 and 4 are used. No paraboloidal reflecting mirror is used. The reflecting mirror 4 has, like the reflecting mirror of the ninth embodiment (FIG. 12), an innermost convex surface, a middle flat surface, and an outermost concave surface. The diameters of the laser beams reflected from the convex and concave surfaces increase and decrease only slightly.

The split laser beams b1, b2 and b3 reflected from the reflecting mirror 4 are converged on focal points P1, P2 and P3, respectively, by the condensing lens 5. The focal points P1, P2 and P3 are arranged along the center axis of the beams. In FIG. 14A, the laser beams b1, b2 and b3 appear to be parallel beams. But actually, the beam b1 is expanding slightly toward the lens 5, while the beam b3 is shrinking slightly toward the lens 5.

Figure 15:
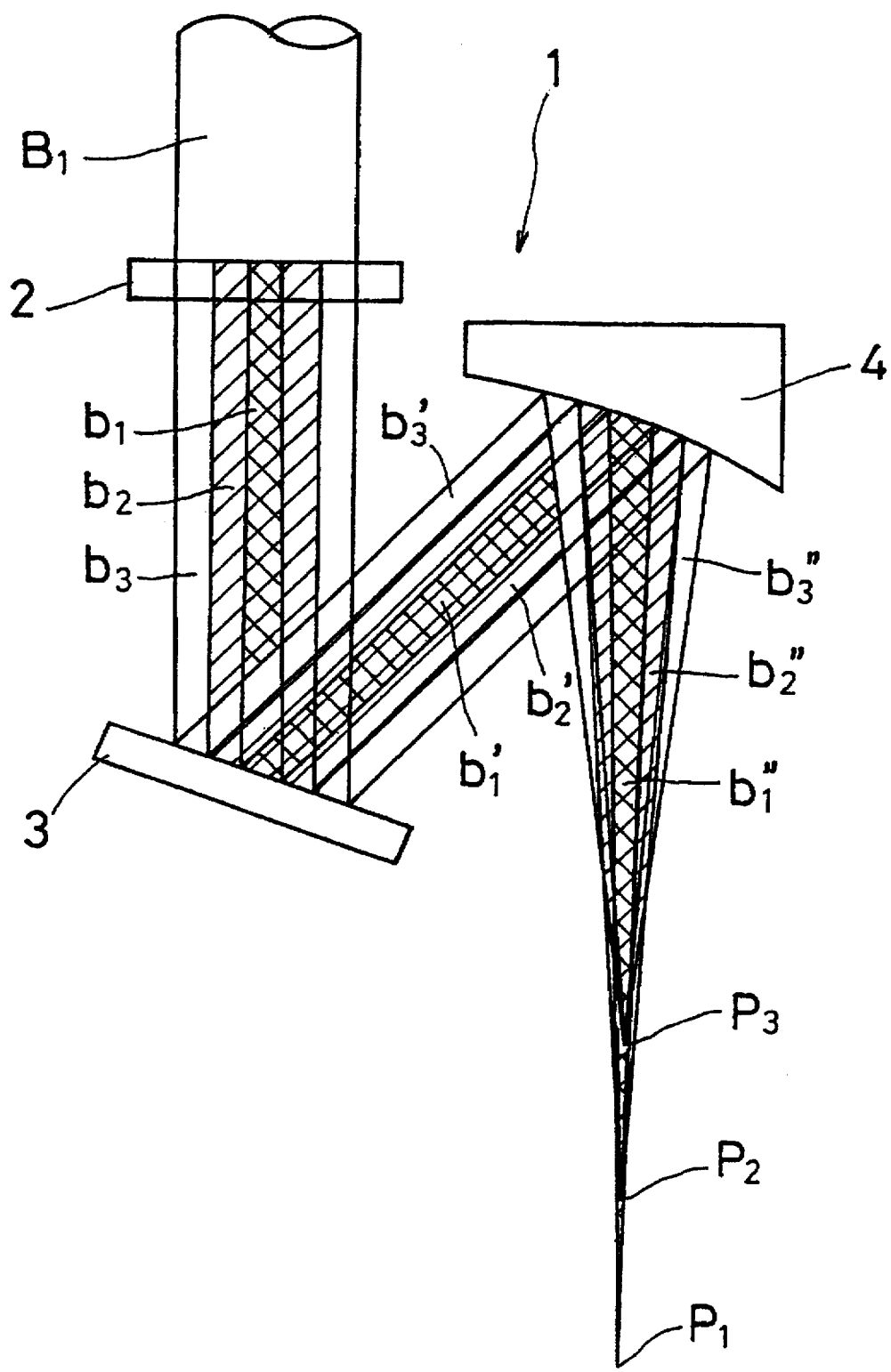
FIG. 15 is a schematic sectional view of an 11th embodiment.

FIG. 15 is a schematic sectional view of the machining head of an 11th embodiment. It includes a window 2, a flat reflecting mirror 3, and a paraboloidal reflecting mirror 4.

Figure 16A:
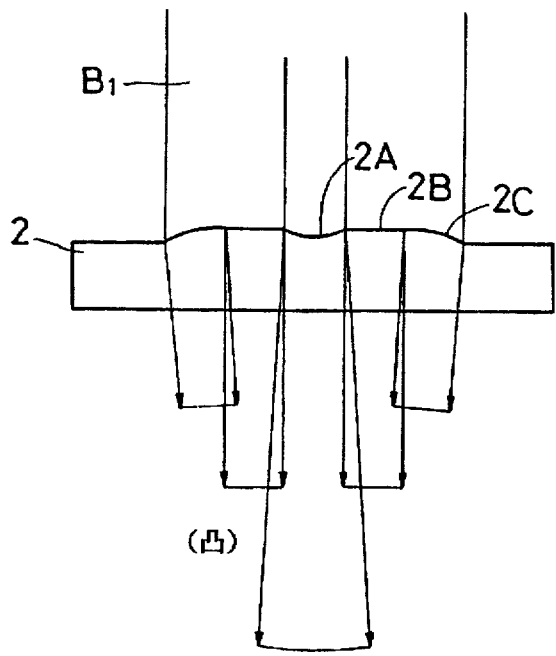
FIGS. 16A-16C are partial enlarged sectional views of the 11th embodiment.
Figure 16B:
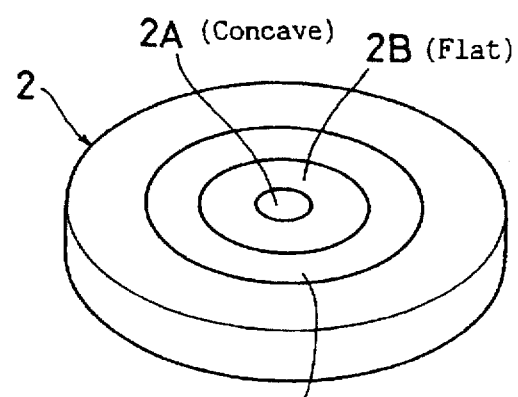

The window 2 is not a simple flat-surfaced window but a transparent window having an innermost concave surface 2A, a middle flat surface 2B, and an outermost convex surface 2C (FIGS. 16). The reflecting mirror 3 is a single flat mirror. The reflecting mirror 4 is a single paraboloidal reflecting mirror.

Figure 16C:
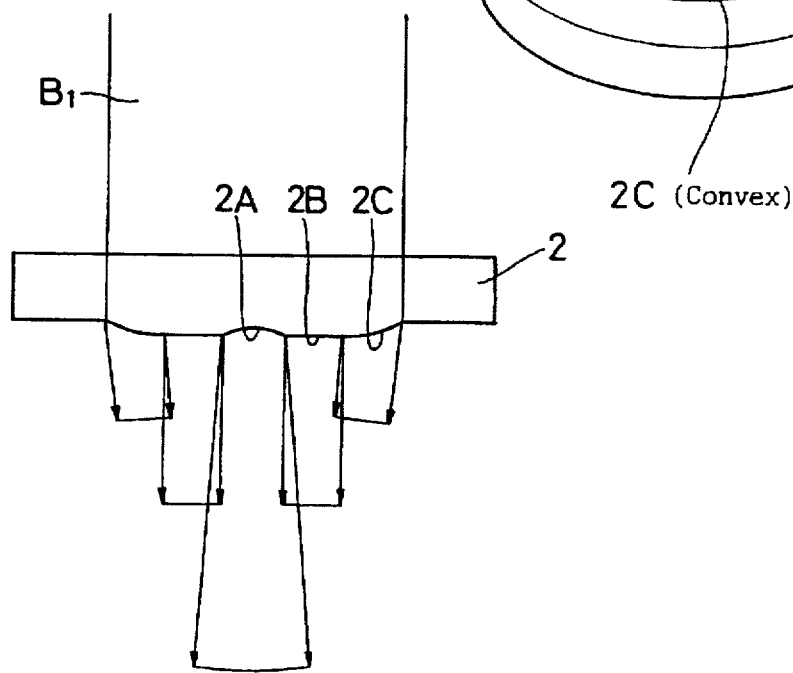

As shown in FIGS. 16A and 16C, the surfaces 2A, 2B and 2C may be formed on the side of the window 2 facing the laser beam B1, or on the other side thereof.

The split laser beams b1, b2 and b3 are reflected by the reflecting mirror 3. The thus reflected beams b'1, b'2 and b'3 are reflected by the reflecting mirror 4, so that the thus reflected beams b"1, b"2 and b"3 converge on focal points P1, P2 and P3.

Figure 17:
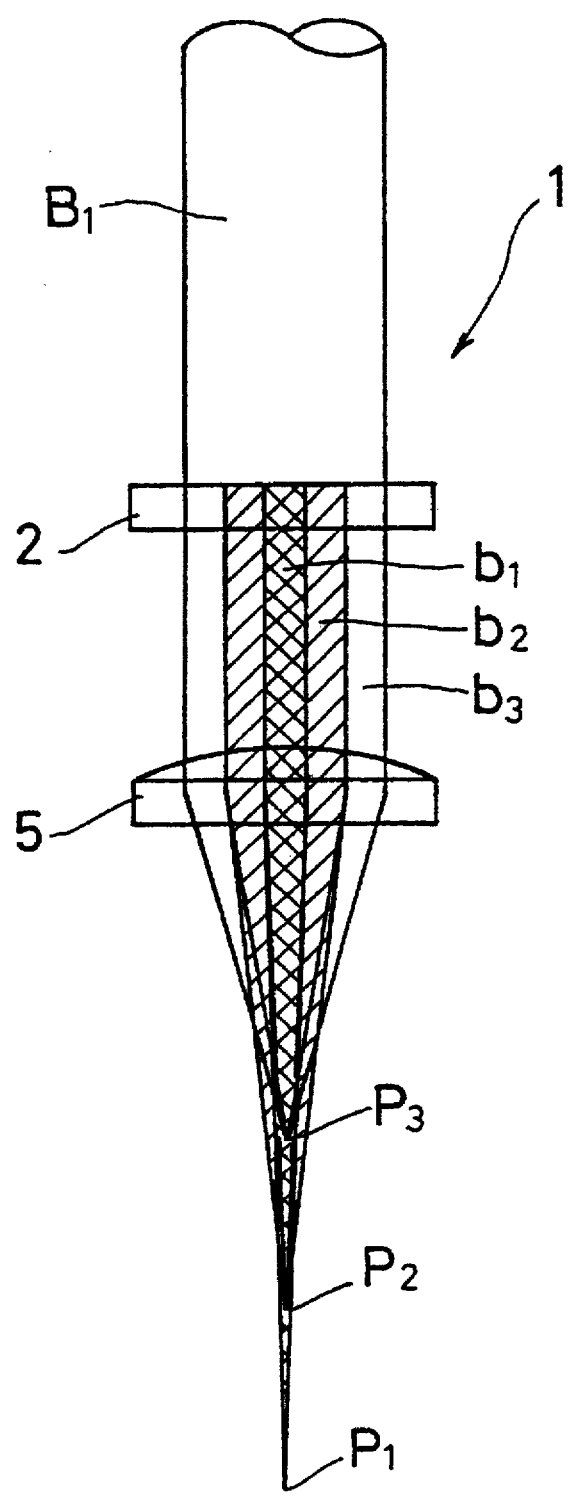
FIG. 17 is a partial enlarged sectional view of a 12th embodiment.
Figure 18A:
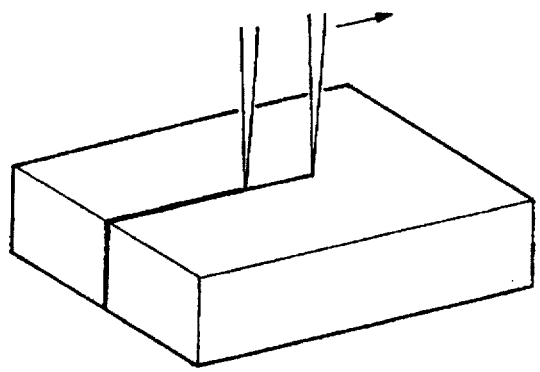
FIGS. 18-21 explain the principle of laser machining.
Figure 18B:
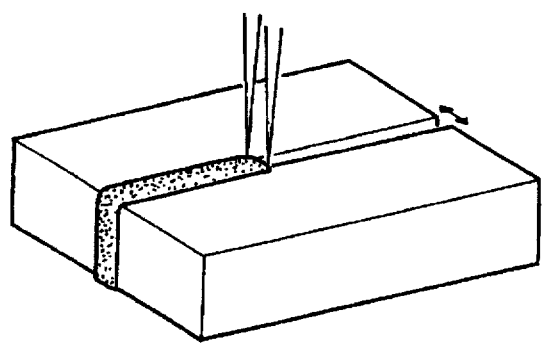
Figure 18C:
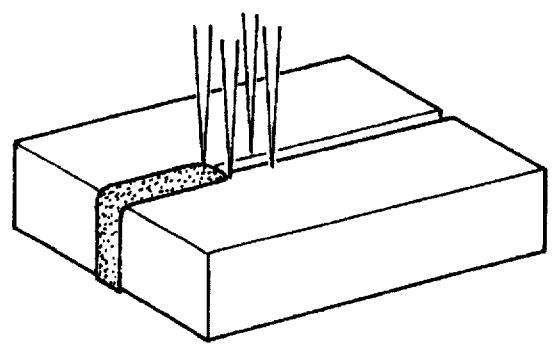
Figure 19A:
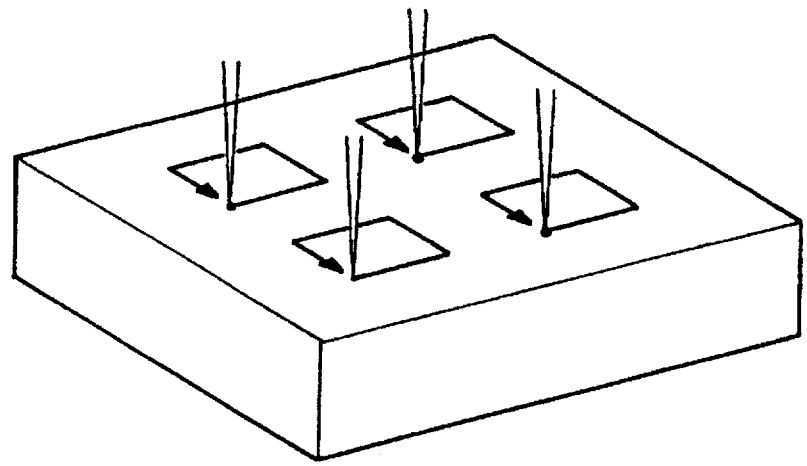
Figure 19:
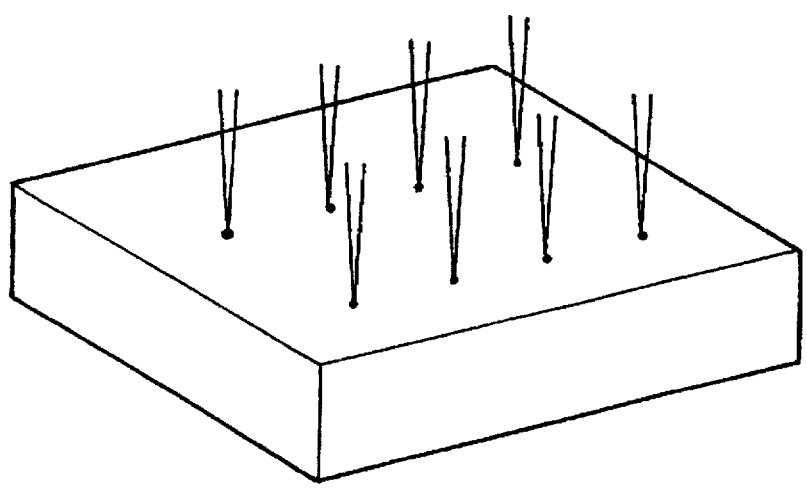
Figure 20A:
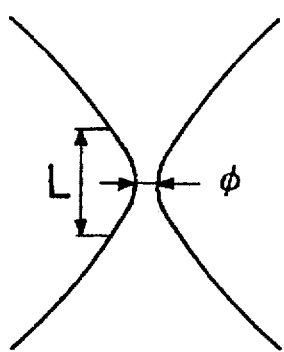
Figure 20B:
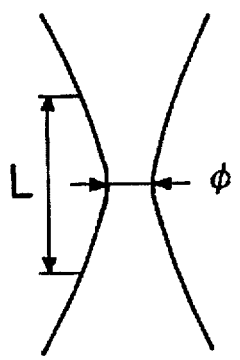
Figure 20C:
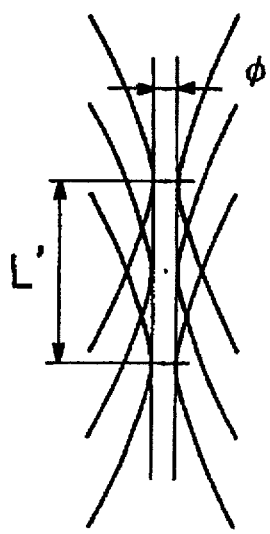
Figure 21A:
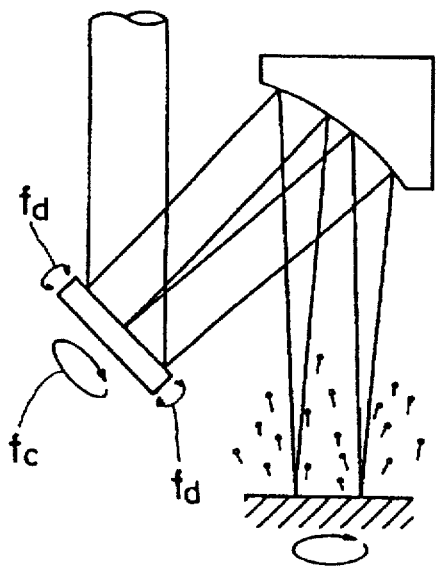
Figure 21B:
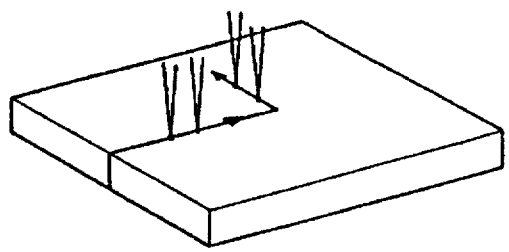
Figure 21C:
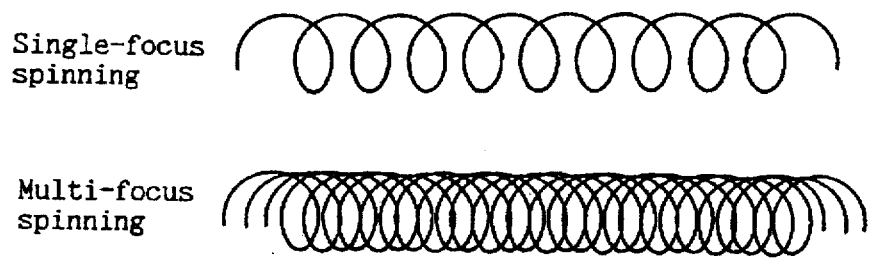
Figure 21D:
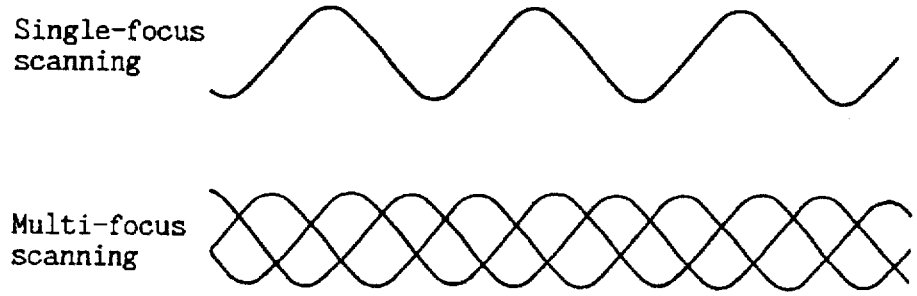
Figure 22:
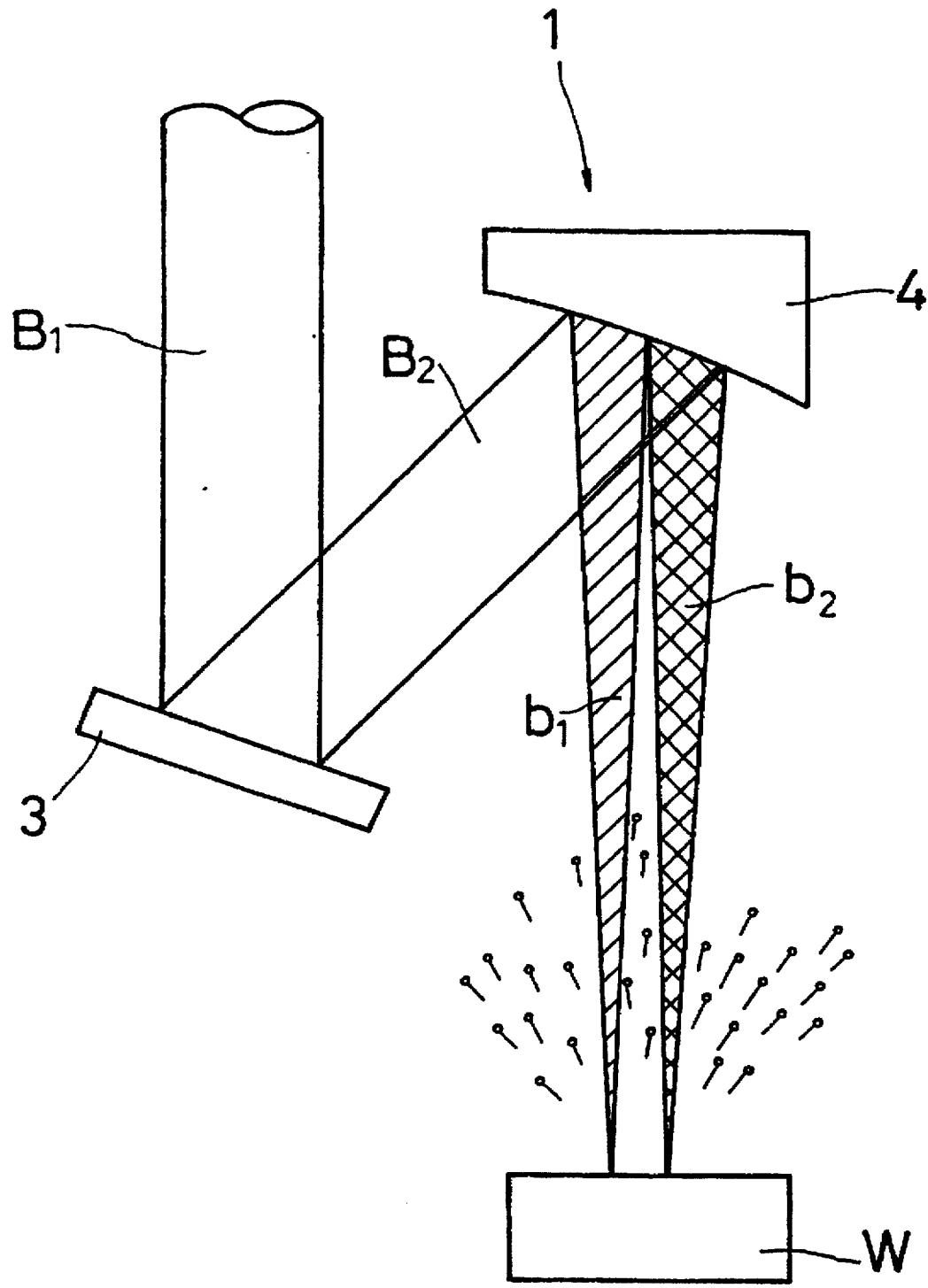
FIGS. 22-25 are schematic sectional view of a machining head of conventional optical devices.
Figure 23:
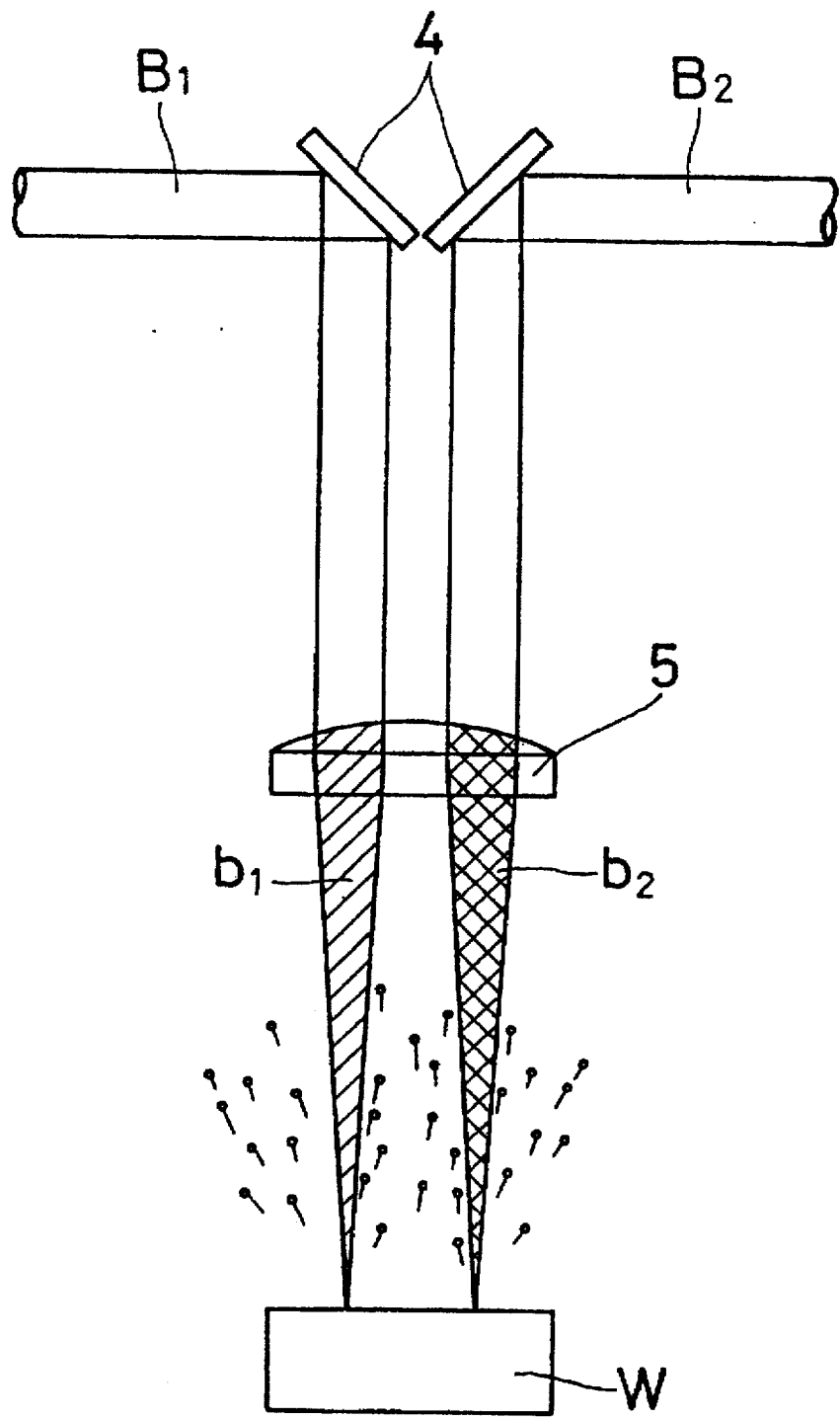
Figure 24A:
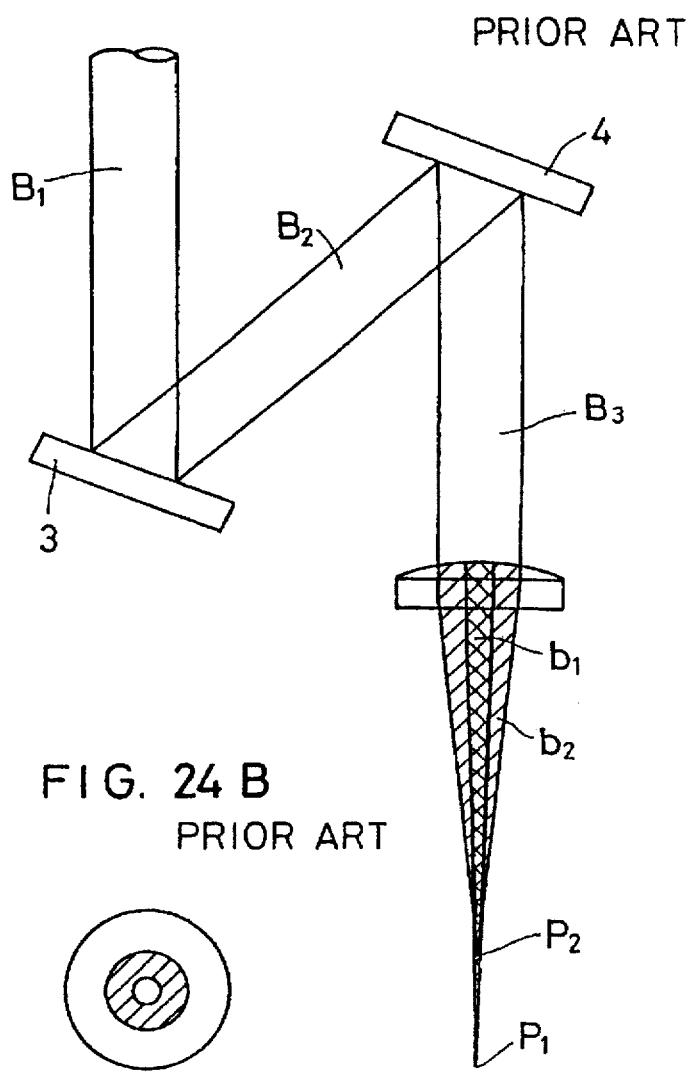
Figure 24B:
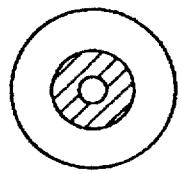
Figure 24B:
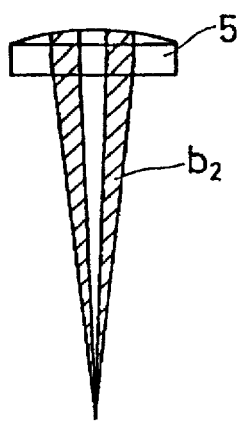
Figure 24C:
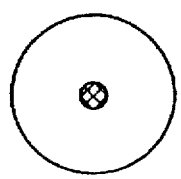
Figure 24C:
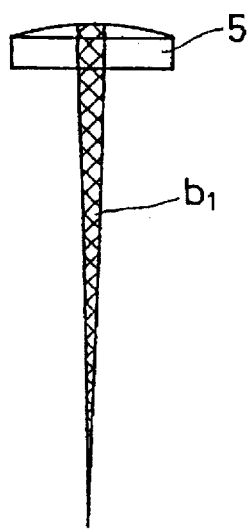
Figure 25:
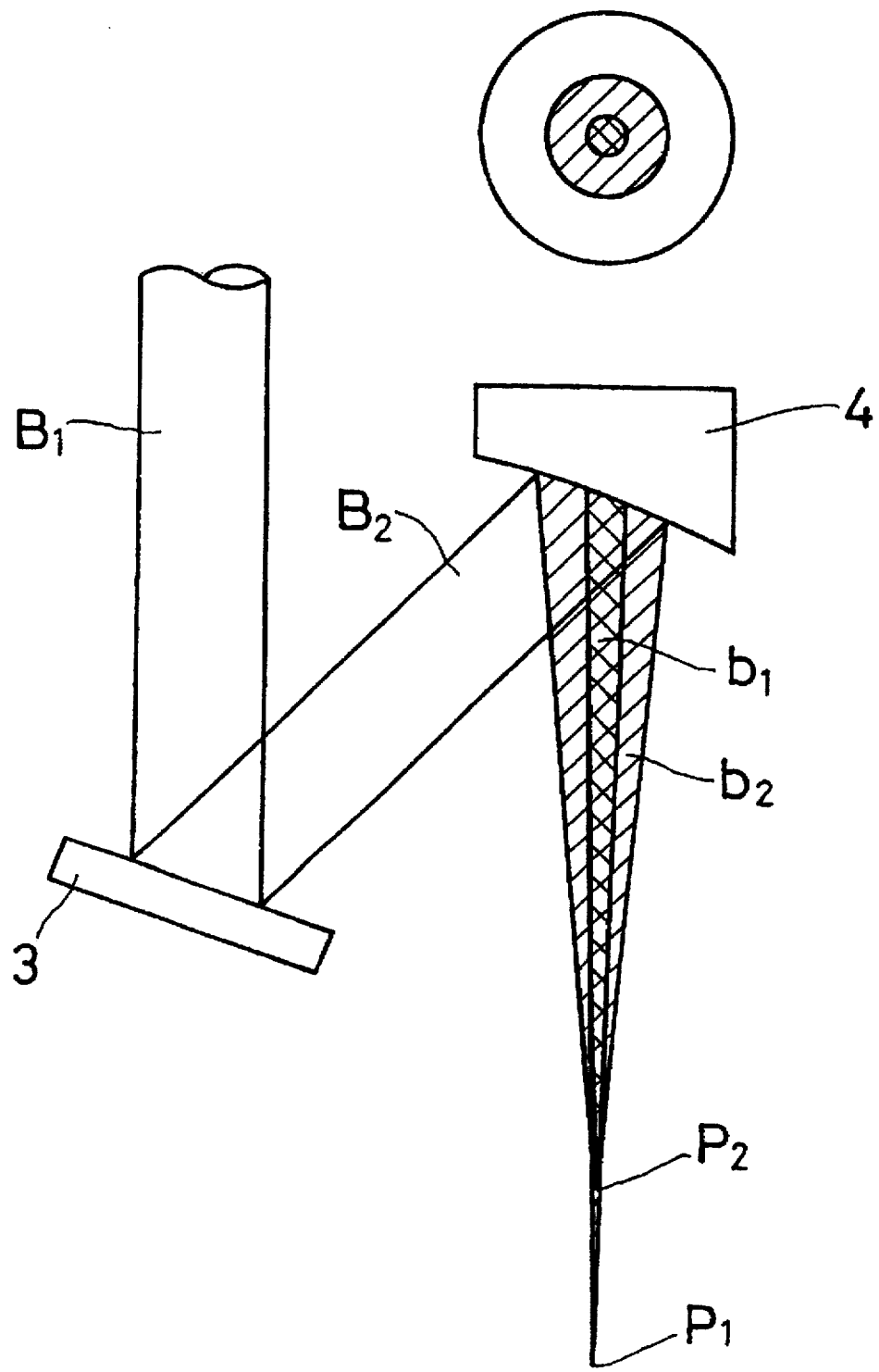

FIG. 17 shows a schematic sectional view of the machining head of the 12th embodiment. In this embodiment, the reflecting mirrors 3 and 4 used in the 11th embodiment are omitted. The laser beam B1 is split by a window 2 and converged on a plurality of focal points by a condensing lens 5.

The window 2 is of exactly the same type used in the 11th embodiment, while the condensing lens 5 is exactly the same type used in the tenth embodiment.

In this embodiment, the laser beam B1 is split into three beams b1, b2 and b3 by the window 2. The split beams b1, b2 and b3 are then converged on focal points P1, P2 and P3 by the condensing lens 5.

What is claimed is:

1. An optical device comprising:
    a laser oscillator;
    a transmitting means for transmitting a laser beam produced by said laser oscillator; and
    a converging means for converging the laser beam from said transmitting means onto a plurality of focal points, said converging means comprising:
        a laser beam splitting unit for splitting the laser beam into a plurality of split beams, and
        a converging unit for converging the plurality of split beams on to the surface of a workpiece,
        wherein said laser beam splitting unit is provided separately from and upstream of said converging unit;
    wherein said laser beam splitting unit comprises a reflecting mirror having a plurality of flat reflecting mirror members separated from each other along straight lines; and
    wherein said reflecting mirror has a center and is rotatable about said center.

2. The optical device of claim 1, wherein each of said flat reflecting mirror members is capable of being independently inclined in a predetermined direction.

3. The optical device of claim 1, wherein said reflecting mirror is movable in a predetermined direction.

4. An optical device comprising:
    a laser oscillator;
    a transmitting means for transmitting a laser beam produced by said laser oscillator; and
    a converging means for converging the laser beam from said transmitting means onto a plurality of focal points, said converging means comprising:
        a laser beam splitting unit for splitting the laser beam into a plurality of split beams, and
        a converging unit for converging the plurality of split beams on to the surface of a workpiece,
        wherein said laser beam splitting unit is provided separately from and upstream of said converging unit;

wherein said laser beam splitting unit comprises a splitting window including a plurality of splitting members separated from each other along straight lines, said splitting window being movable in a predetermined direction.

5. The optical device of claim 4, wherein said splitting window has a center and is rotatable about said center.

6. An optical device comprising:

a laser oscillator;

a transmitting means for transmitting a laser beam produced by said laser oscillator; and a converging means for converging the laser beam from said transmitting means onto a plurality of focal points, said converging means comprising:
 a laser beam splitting unit for splitting the laser beam into a plurality of split beams, and
 a converging unit for converging the plurality of split beams on to the surface of a workpiece,
 wherein said laser beam splitting unit is provided separately from and upstream of said converging unit;
wherein said laser beam splitting unit comprises a splitting window including a plurality of splitting members separated from each other along straight lines, said splitting window having a center and being rotatable about said center.

7. An optical device comprising:

a laser oscillator;

a transmitting means for transmitting a laser beam produced by said laser oscillator along an optical axis of the laser beam; and a converging means for converging the laser beam from said transmitting means onto a plurality of focal points, said converging means comprising:
 a laser beam splitting unit for splitting the laser beam into a plurality of split beams, and
 a converging unit for converging the plurality of split beams on to the surface of a workpiece,
 wherein said laser beam splitting unit is provided separately from and upstream of said converging unit;
 wherein said laser beam splitting unit comprises a plurality of splitting members arranged concentrically around the optical axis of the laser beam, said splitting members comprising concave, convex and plane reflecting mirrors arranged to form a reflecting mirror.

* * * * *